(12) United States Patent
Shibukawa et al.

(10) Patent No.: US 8,990,674 B2
(45) Date of Patent: Mar. 24, 2015

(54) WEBSITE BROWSING SYSTEM USING PAGE CONTENT CONVERTED TO AN IMAGE

(75) Inventors: Tomoe Shibukawa, Tokyo (JP); Kentaro Watanabe, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 728 days.

(21) Appl. No.: 12/837,367

(22) Filed: Jul. 15, 2010

(65) Prior Publication Data

US 2011/0016403 A1 Jan. 20, 2011

(30) Foreign Application Priority Data

Jul. 16, 2009 (JP) .................................. 2009-167975
Mar. 12, 2010 (JP) .................................. 2010-056149

(51) Int. Cl.
 G06F 17/00 (2006.01)
 H04M 1/725 (2006.01)
 G06F 17/30 (2006.01)

(52) U.S. Cl.
 CPC ..... *H04M 1/72561* (2013.01); *G06F 17/30899* (2013.01); *G06F 17/30905* (2013.01)
 USPC ............................ 715/205; 715/864; 709/217

(58) Field of Classification Search
 None
 See application file for complete search history.

(56) References Cited

U.S. PATENT DOCUMENTS

| | | | |
|---|---|---|---|
| 6,704,024 B2 * | 3/2004 | Robotham et al. ............ | 345/581 |
| 7,356,570 B1 * | 4/2008 | Tuli ............................... | 709/217 |
| 8,156,418 B2 * | 4/2012 | Gowda et al. ................. | 715/202 |
| 2002/0062396 A1 * | 5/2002 | Kakei et al. .................... | 709/246 |
| 2003/0023640 A1 * | 1/2003 | Challenger et al. ........... | 707/530 |
| 2004/0230889 A1 * | 11/2004 | Ishiyama et al. ........... | 715/501.1 |
| 2005/0041858 A1 * | 2/2005 | Celi et al. ...................... | 382/173 |
| 2006/0026511 A1 * | 2/2006 | Rainero et al. ................ | 715/523 |
| 2007/0070373 A1 * | 3/2007 | Silverbrook et al. ........ | 358/1.12 |
| 2008/0222273 A1 * | 9/2008 | Lakshmanan et al. ........ | 709/219 |
| 2010/0198805 A1 * | 8/2010 | Choi et al. .................... | 707/711 |

FOREIGN PATENT DOCUMENTS

| | | |
|---|---|---|
| JP | 2004-220260 | 8/2004 |
| JP | 2006-155333 | 6/2006 |

* cited by examiner

*Primary Examiner* — Stephen Hong
*Assistant Examiner* — Asher Kells
(74) *Attorney, Agent, or Firm* — McGinn IP Law Group, PLLC

(57) ABSTRACT

Web contents prepared for browsing by a PC is converted into an image showing a view when the webpage is browsed using a PC. Pieces of UI information are extracted from the web contents and XY coordinate values of each piece of UI information are acquired. This information indicates positions where the pieces of UI information are arranged on the image. A mobile terminal displaying the image controls these pieces of UI information. Accordingly, web contents for a PC are rapidly browsed and operated on a mobile terminal and so on, without deterioration in design of the web contents.

13 Claims, 29 Drawing Sheets

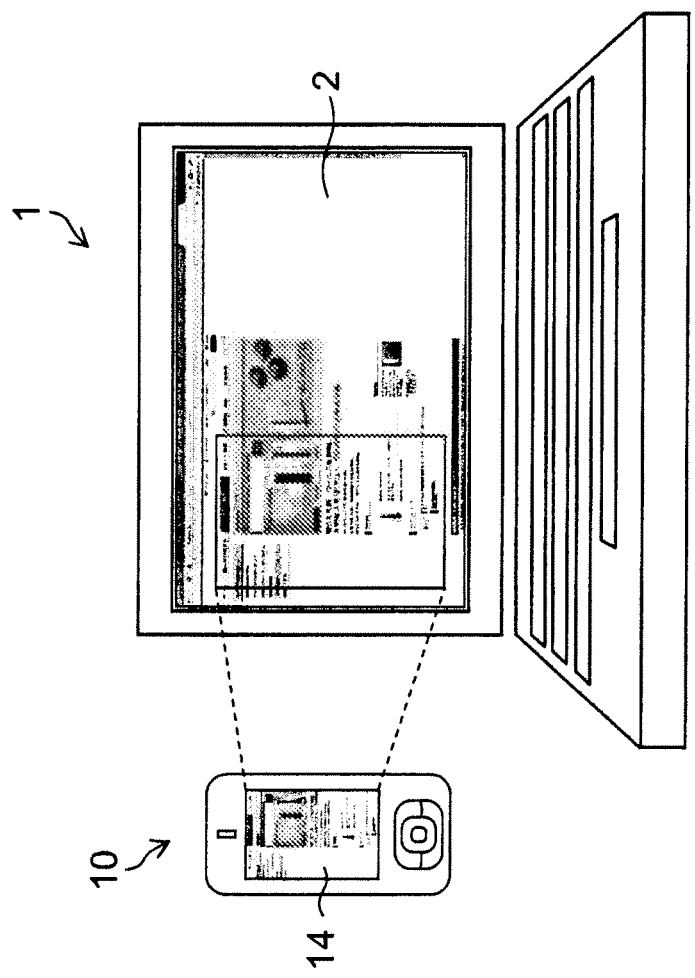

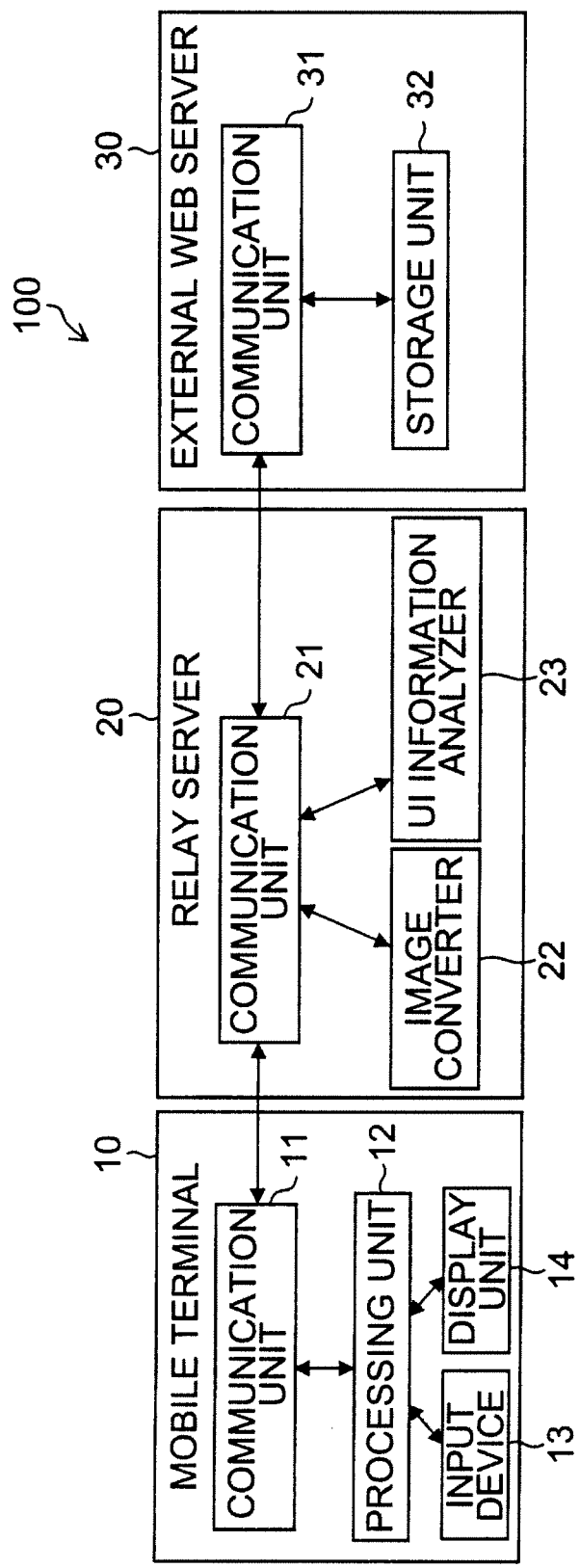

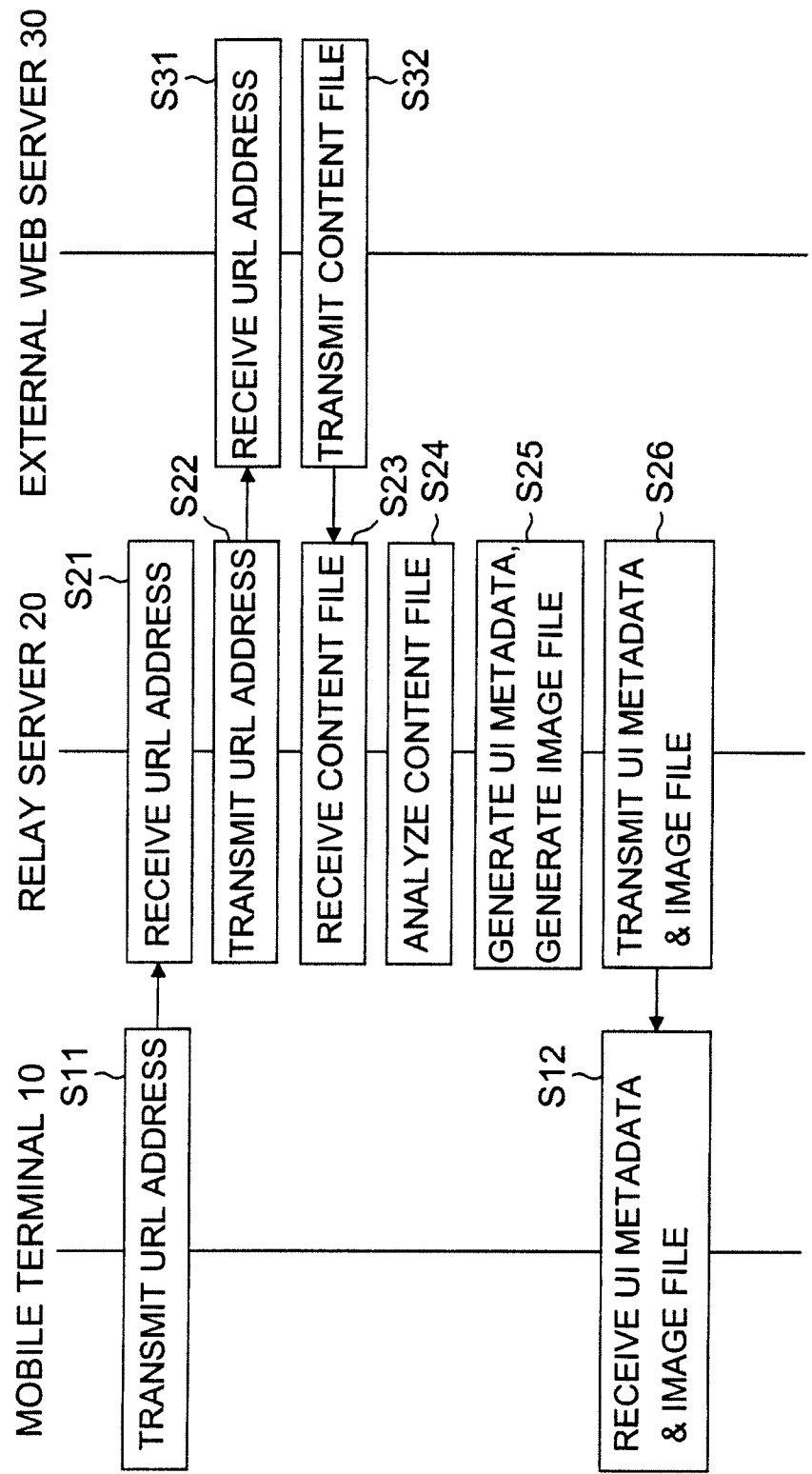

FIG.4B

HTML FILE DESCRIPTION EXAMPLE

```
· · · · OMITTED · · · ·
<form method="post" action="○○">
    · · · OMITTED · · · ·
    <input type="text" name="mail-address" value="" size="22" maxlength="31">
    · · · OMITTED · · · ·
    <input type="radio" name="sex" value="man" checked>Male
    <input type="radio" name="sex" value="woman">Female
    · · · OMITTED · · · ·
    <a href="...">Terms of Service</a>
    · · · OMITTED · · · ·
    <a href="...">Privacy Policy</a>
    · · · OMITTED · · · ·
    <input type="submit" name="registration" value=" I Agree to Terms of Service and Register">
    · · · OMITTED · · · ·
</form>
    · · · OMITTED · · · ·
```

301, 302, 303, 304, 305, 306

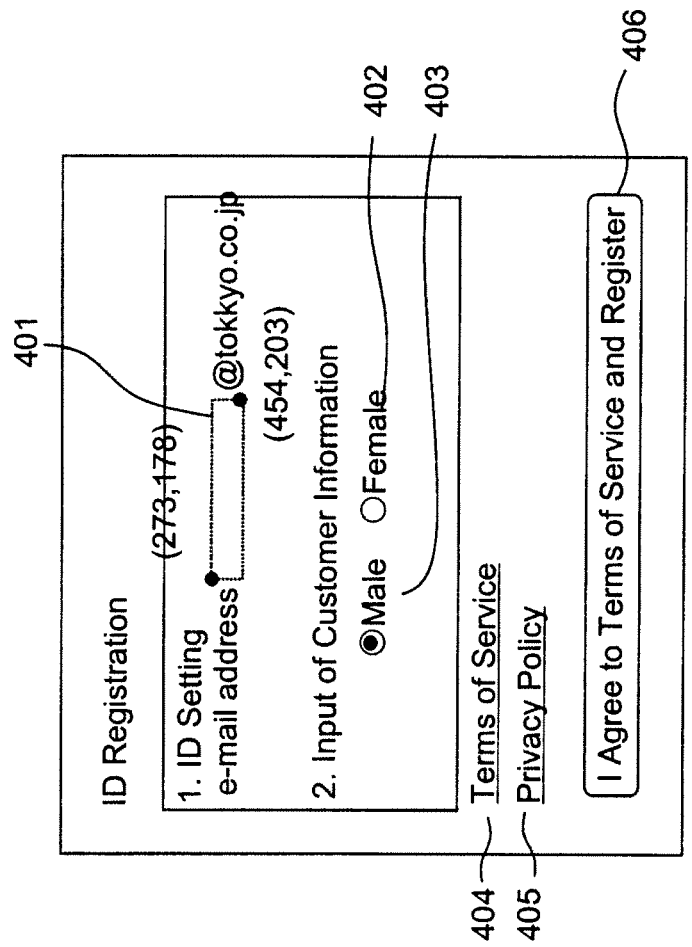

FIG.5

| UI INFORMATION ID | STARTING X COORDINATE | STARTING Y COORDINATE | END X COORDINATE | END Y COORDINATE | LINK OR FORM | TYPE | NAME | VALUE | CHECKED | MAX LENGTH | DISPLAY CHARACTER STRING |
|---|---|---|---|---|---|---|---|---|---|---|---|
| 201 | 273 | 178 | 454 | 203 | FORM1 | TEXT | MAIL-ADDRESS | | | 31 | |
| 202 | 271 | 447 | 324 | 465 | FORM1 | RADIO | SEX | MALE | TRUE | | MALE |
| 203 | 326 | 447 | 379 | 465 | FORM1 | RADIO | SEX | FEMALE | FALSE | | FEMALE |
| 204 | 497 | 651 | 554 | 665 | LINK | | | | | | TERMS OF SERVICE |
| 205 | 364 | 669 | 486 | 681 | LINK | | | | | | PRIVACY POLICY |
| 206 | 279 | 738 | 527 | 773 | FORM1 | SUBMIT | REGISTRATION | AGREE TO TERMS OF SERVICE AND REGISTER | | | |

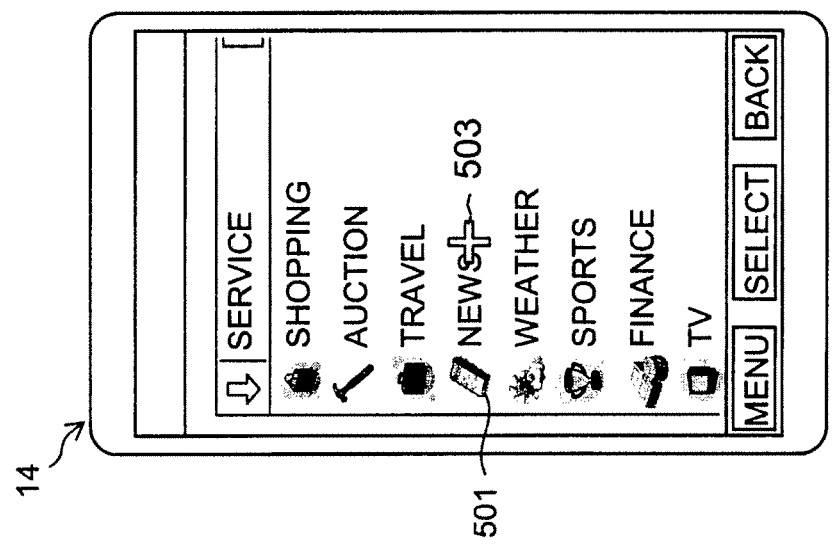

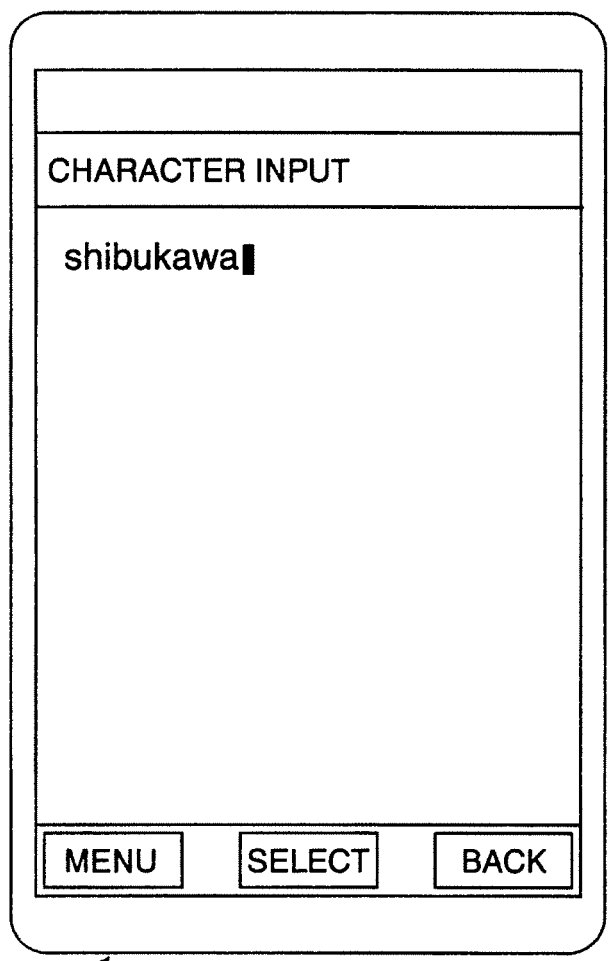

FIG.11A

| UI INFORMATION ID | STARTING X COORDINATE | STARTING Y COORDINATE | END X COORDINATE | END Y COORDINATE | LINK OR FORM | TYPE | NAME | VALUE | CHECKED | MAX LENGTH | DISPLAY CHARACTER STRING |
|---|---|---|---|---|---|---|---|---|---|---|---|
| 201 | 273 | 178 | 454 | 203 | | | | | | | |
| 202 | 271 | 447 | 324 | 465 | FORM1 | TEXT | MAIL-ADDRESS | | | 31 | |
| 203 | 326 | 447 | 379 | 465 | FORM1 | RADIO | SEX | MALE | TRUE | | MALE |
| 204 | 497 | 651 | 554 | 665 | FORM1 | RADIO | SEX | FEMALE | FALSE | | FEMALE |
| 205 | 364 | 669 | 486 | 681 | LINK | | | | | | TERMS OF SERVICE |
| 206 | 279 | 738 | 527 | 773 | LINK | | | | | | PRIVACY POLICY |
| | | | | | FORM1 | SUBMIT | REGISTRATION | I AGREE TO TERMS OF SERVICE AND REGISTER | | | |

FIG.11B

| UI INFORMATION ID | STARTING X COORDINATE | STARTING Y COORDINATE | END X COORDINATE | END Y COORDINATE | LINK OR FORM | TYPE | NAME | VALUE | CHECKED | MAX LENGTH | DISPLAY CHARACTER STRING |
|---|---|---|---|---|---|---|---|---|---|---|---|
| 201 | 273 | 178 | 454 | 203 | | | | | | | |
| 202 | 271 | 447 | 324 | 465 | FORM1 | TEXT | MAIL-ADDRESS | shirakawa | | 31 | |
| 203 | 326 | 447 | 379 | 465 | FORM1 | RADIO | SEX | MALE | TRUE | | MALE |
| 204 | 497 | 651 | 554 | 665 | FORM1 | RADIO | SEX | FEMALE | FALSE | | FEMALE |
| 205 | 364 | 669 | 486 | 681 | LINK | | | | | | TERMS OF SERVICE |
| 206 | 279 | 738 | 527 | 773 | LINK | | | | | | PRIVACY POLICY |
| | | | | | FORM1 | SUBMIT | REGISTRATION | I AGREE TO TERMS OF SERVICE AND REGISTER | | | |

FIG.11C

| UI INFORMATION ID | STARTING X COORDINATE | STARTING Y COORDINATE | END X COORDINATE | END Y COORDINATE | LINK OR FORM | TYPE | NAME | VALUE | CHECKED | MAX LENGTH | DISPLAY CHARACTER STRING |
|---|---|---|---|---|---|---|---|---|---|---|---|
| 201 | 273 | 178 | 454 | 203 | | | | | | | |
| 202 | 271 | 447 | 324 | 465 | FORM1 | TEXT | MAIL-ADDRESS | shibukawa | | 31 | |
| 203 | 326 | 447 | 379 | 465 | FORM1 | RADIO | SEX | MALE | FALSE | | MALE |
| 204 | 497 | 651 | 554 | 665 | FORM1 | RADIO | SEX | FEMALE | TRUE | | FEMALE |
| 205 | 364 | 669 | 486 | 681 | LINK | | | | | | TERMS OF SERVICE |
| 206 | 279 | 738 | 527 | 773 | LINK | | | | | | PRIVACY POLICY |
| | | | | | FORM1 | SUBMIT | REGISTRATION | I AGREE TO TERMS OF SERVICE AND REGISTER | | | |

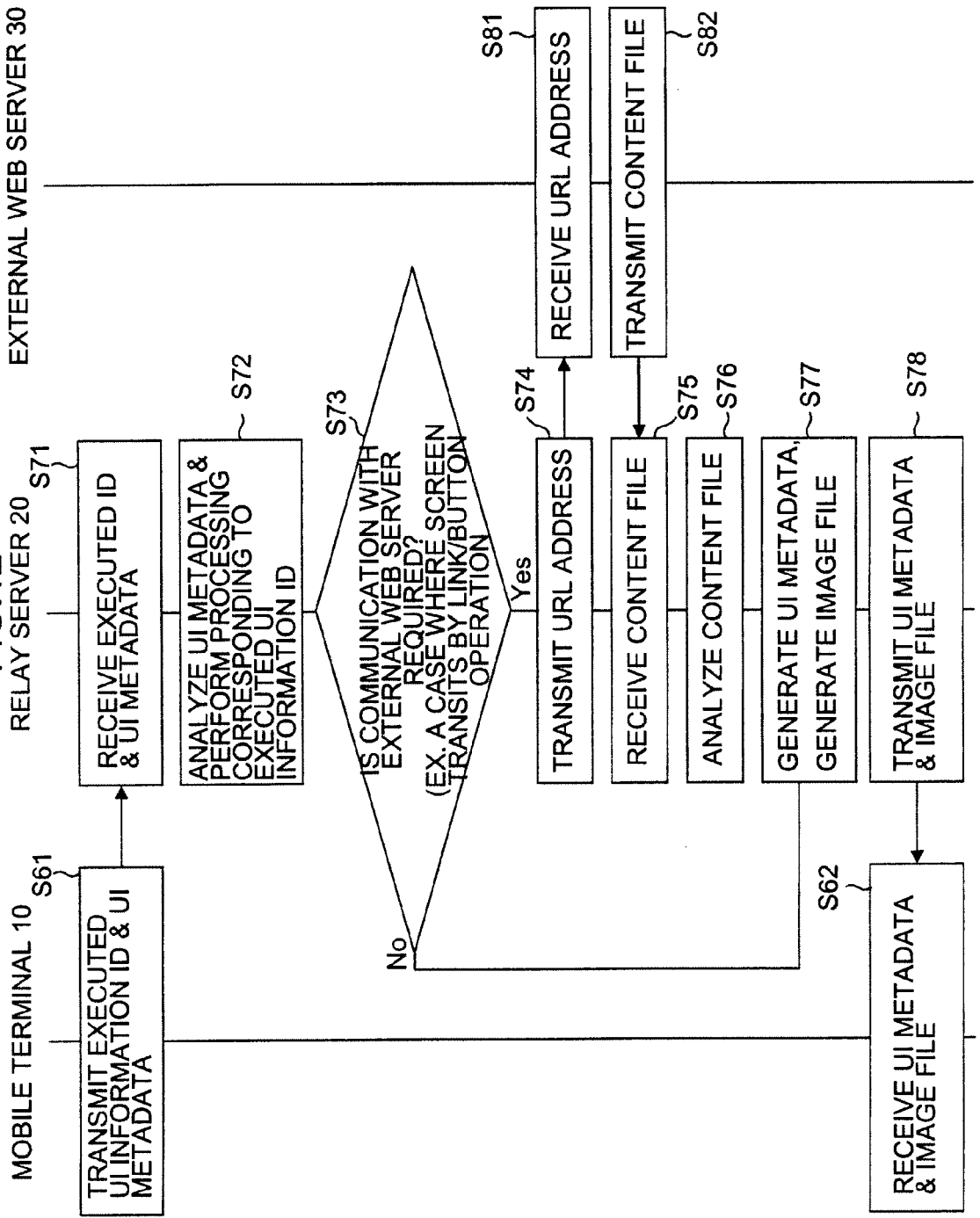

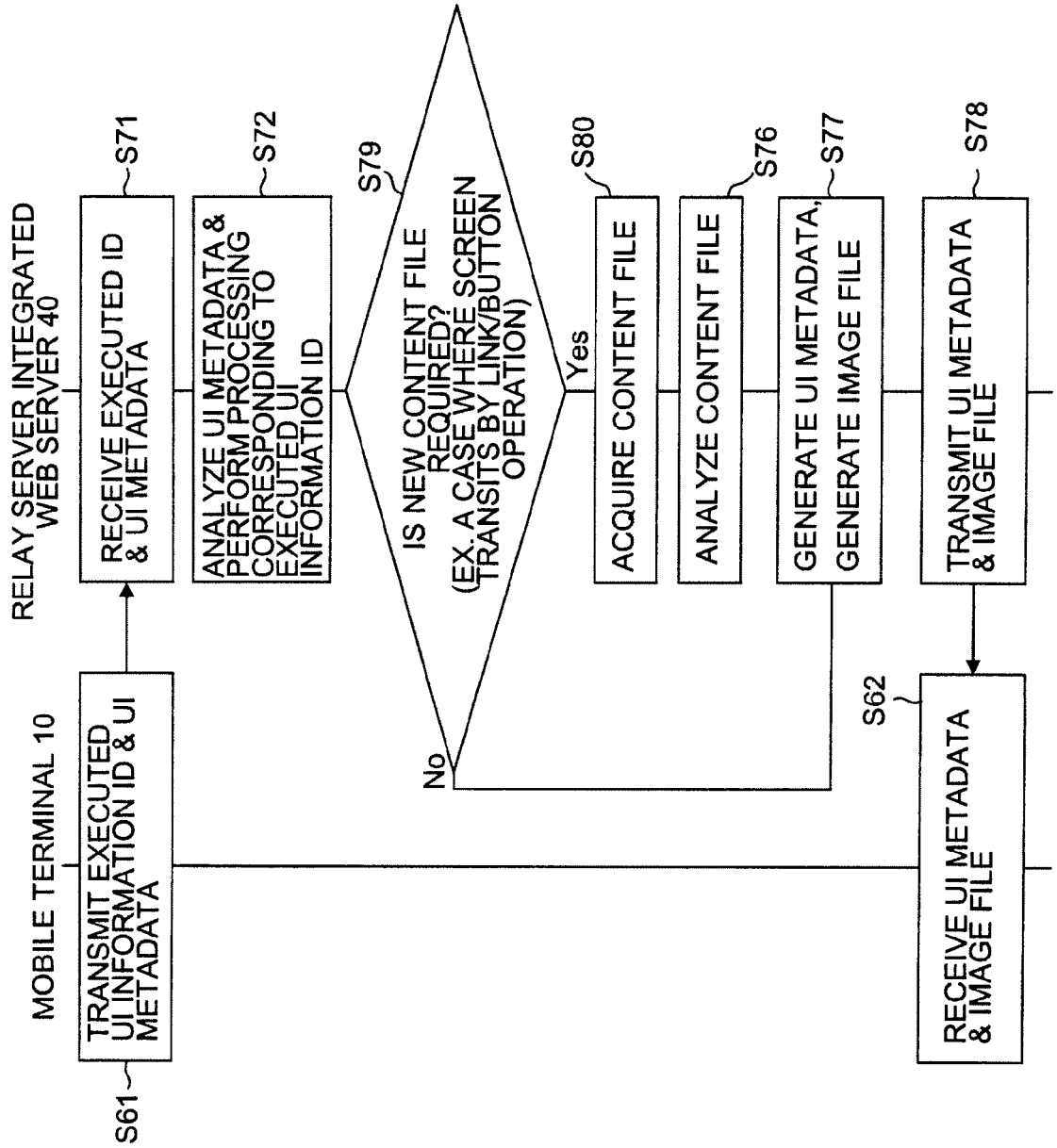

WEBSITE BROWSING SYSTEM USING PAGE CONTENT CONVERTED TO AN IMAGE

BACKGROUND OF THE INVENTION

1. Field of the Invention

The presently disclosed subject matter relates to a website browsing system, server and client terminal, and in particular, to a website browsing system, server and client terminal for browsing and operating a website for a PC (personal computer) on a client terminal, such as a mobile phone, which has restriction of screen size and downloadable file size.

2. Description of the Related Art

Apparently, there are many situations of browsing websites using a mobile phone in recent years. However, creation of websites for a mobile phone in addition to websites for a PC takes a great deal of effort and cost. Therefore, website creators are reluctant to create websites for a mobile phone. Accordingly, there may often be cases where websites posting information that users want to browse include sites for web-browsing by a PC only and do not include sites for web-browsing by a mobile phone.

When a user browses a website for a PC using a mobile phone whose screen size and downloadable file size are smaller than those of the PC, a content file may be received in a divided manner and displayed over a plurality of pages. In this case, appearances (page layout) of the webpage may be different compared to a case when a PC is used to browse the webpage.

Instead, conversion into a markup language for a mobile phone may be adopted. However, the conversion tends to cause a problem of deterioration in design.

In order to addressing this problem, a method for creating an image of a website for a PC to display the image on a mobile phone has been proposed. For example, according to Japanese Patent Application Laid-Open No. 2004-220260, in an image distribution server, a webpage is created from elements of a HTML document of an acquired webpage, the created webpage is converted into image data such as a bitmap and then transmitted to a client terminal (mobile phone). When a user clicks using a pointing device a character string or the like displayed on a client terminal displaying the image data, click position coordinate data and the URL of the displayed webpage are transmitted to the image distribution server. The image distribution server examines whether a link pointer corresponding to the transmitted click position coordinates exists or not on the basis of the constituent elements of the webpage. If the link pointer exists, the image distribution server accesses to a web server located by the URL (Uniform Resource Locator) indicated by the link pointer.

The technique in the Japanese Patent Application Laid-Open No. 2004-220260 enables to browse a webpage using even a client terminal in which a web browser is not implemented.

SUMMARY OF THE INVENTION

The technique in the Japanese Patent Application Laid-Open No. 2004-220260 enables to support a link pointer (link tag in the HTML) in a webpage and to display linked content corresponding to a position clicked by the user. However, the technique does not support entry forms, such as text entry and check boxes, other than the link tag. Here, information including a text entry box, a check box, a radio button and pull-down menu, which is description requiring a user to input some data or selection result in a webpage, is referred to as UI (User Interface) information. The technique in the Japanese Patent Application Laid-Open No. 2004-220260 thus has a problem that it cannot deal with all pieces of user interface (UI) information in a webpage.

Further, the technique has another problem that a load on a server becomes heavy because the client terminal (mobile phone) communicates with the server every time when user operation is made, which also makes communication time longer.

The presently disclosed subject matter is made in view of these situations. The presently disclosed subject matter aims to provide a website browsing system, server and client terminal which enable a client to rapidly browse and operate a webpage for a PC using a mobile phone and the like, without causing deterioration in design of a webpage.

In order to achieve the above object, according to a first aspect of the presently disclosed subject matter, a website browsing system connecting a client terminal to a server is provided, in which the server includes: a page content acquisition device which acquires page content requested by the client terminal; an image convertor which converts the acquired page content into an image; a UI information analyzer which extracts UI information from the acquired page content and generates UI information metadata on the basis of the extracted UI information; and a device which transmits the converted image and the generated UI information metadata to the client terminal; and the client terminal includes: a device which requests desired page content from the server; a device which receives the image of the requested page content and the UI information metadata transmitted from the server; a display control device which controls to make the image displayed on a display device; and a UI information control device which controls the UI information on the image displayed on the display device based on the UI information metadata.

According to the first aspect of the presently disclosed subject matter, in the server, the acquired page content is converted into the image and the UT information metadata is generated, the image and the UI information metadata are transmitted to the client terminal. The client terminal having received the image and the metadata displays the image on the display device and controls the UI information on the image on the basis of the UI metadata. This enables a webpage for a PC to be rapidly browsed and operated using a mobile phone and the like, without causing deterioration in design of the webpage.

According to a second aspect of the presently disclosed subject matter, in the website browsing system according to the first aspect, the client terminal further includes: an execution device which executes the UI information on the image displayed on the display device; a device which rewrites the UI information metadata based on the UI information executed by the execution device; and a device which rewrites the image based on the rewritten UI information metadata.

This allows the image to be displayed according to an operation of the executed UI information.

According to a third aspect of the presently disclosed subject matter, in the website browsing system according to the first aspect, the client terminal further includes: an execution device which executes the UI information on the image displayed on the display device; a device which rewrites the UI information metadata based on the UI information executed by the execution device; and a device which transmits the rewritten UI information data to the server; and the server further includes: a device which receives the rewritten UI information metadata transmitted from the client terminal; a device which rewrites the image based on the received UI information metadata; and a device which transmits the rewritten image to the client terminal.

This allows the image to be displayed according to an operation to the executed UI information.

According to a fourth aspect of the presently disclosed subject matter, in the website browsing system according to the second or third aspect, the client terminal further comprises a device which transmits to the server information identifying the UI information executed by the execution device when the executed UI information accompanied by screen transition, and the server receives the information identifying the executed UI information, transmits to the client terminal the image of the page content to be subsequently displayed and the UI metadata of the page content based on the received information.

Thus, when the UI information accompanied by screen transition is operated, the image to be subsequently displayed can appropriately be displayed.

According to a fifth aspect of the presently disclosed subject matter, in the website browsing system according to any one of the first to fourth aspects, the execution device includes: a movement device which relatively moves a cursor and the image displayed on the display device; and a determination device which determines the UI information existing on a position overlapping a position of the cursor as the UI information to be executed.

Therefore, a user can appropriately select UI information which the user wants to execute.

According to a sixth aspect of the presently disclosed subject matter, in the website browsing system according to the fifth aspect, the movement device moves the cursor with reference to the image displayed on the display device.

Therefore, a user can appropriately select UI information which the user wants to execute.

According to a seventh aspect of the presently disclosed subject matter, in the website browsing system according to the fifth aspect, the movement device moves the image with reference to the cursor with the cursor displayed at a substantial center of the display device.

Therefore, a user can appropriately select UI information which the user wants to execute.

According to an eighth aspect of the presently disclosed subject matter, in the website browsing system according to any one of the first to seventh aspect, the movement device displays a visual effect on the basis of the UI information metadata.

This allows operability to be improved.

According to a ninth aspect of the presently disclosed subject matter, in the website browsing system according to any one of the first to eighth aspect, the server further includes a storage device in which the page content is stored, and the page content acquisition device acquires the page content from the storage device.

Therefore, the server does not have to communicate with any external device in order to acquire the content file, and thus, rapid and highly operable webpage browsing can be realized.

According to a tenth aspect of the presently disclosed subject matter, in the website browsing system according to any one of the first to ninth aspect, the server includes a device which connects to a web server, and the page content acquisition device acquires the page content from the web server via the device which connects to the web server.

This allows various webpages to be regarded as browsing targets. This further allows content files which are not stored in the server to be regarded as browsing targets.

In order to achieve the above object, a server according to an eleventh aspect of the presently disclosed subject matter includes: a page content acquisition device which acquires page content requested by a client terminal; an image convertor which converts the acquired page content into an image; a UI information analyzer which extracts UI information from the acquired page content and generates UI information metadata based on the extracted UI information; a device which transmits the converted image and the generated UI information metadata to the client terminal; a device which acquires UI information metadata rewritten according to an operation to the client terminal; and a device which analyzes the acquired UI information metadata.

According to the eleventh aspect of the presently disclosed subject matter, the acquired page content is converted into the image and the UI information metadata is generated. And then, the image and the UI information metadata are transmitted to the client terminal, and the UI information metadata rewritten according to an operation to the client terminal is acquired and analyzed. Therefore, the server can recognize the UI information executed by the client terminal.

In order to achieve the above object, a client terminal according to a twelfth aspect of the presently disclosed subject matter includes: a device which receives an image and UI information metadata generated based on UI information extracted from the image; a display control device which controls to make the image displayed on a display device; an execution device which executes the UI information on the image displayed on the display device; a device which rewrites the UI information metadata based on the UI information executed by the execution device; and a device which transmits the rewritten UI information metadata to a source from which the image is transmitted.

According to the twelfth aspect of the presently disclosed subject matter, in the client terminal, the image and the UI information metadata of the image are received and the image is displayed on the display device. Then, the UI information metadata is rewritten on the basis of the executed UI information, and the rewritten UI information metadata is transmitted to the source from which the image has been transmitted. Therefore, the source which has transmitted the image can recognize the executed UI information.

The presently disclosed subject matter enables to rapidly browse and operate a webpage for a PC using a mobile phone and the like, without deterioration in design of a webpage.

BRIEF DESCRIPTION OF THE DRAWINGS

FIG. 1 is a diagram showing appearances (page layout) of a webpage for a PC displayed on a display unit 2 of a PC 1 and a display unit 14 of a mobile terminal 10;

FIG. 2 is a diagram showing an example of an overall configuration of a webpage browsing system 100;

FIG. 3 is a flowchart showing operations until a desired webpage is displayed on the display unit 14 of the mobile terminal 10;

FIGS. 4A to 4C are diagrams for illustrating generation of UI metadata;

FIG. 5 is a data representing metadata stored as a CSV file;

FIGS. 8A and 8B are diagrams showing a case where an image moves responsive to an operation;

FIGS. 10A to 10D are diagrams for illustrating a rewrite of the UI metadata;

FIGS. 11A to 11C are diagrams for illustrating a rewrite of the UI metadata;

FIG. 12 is a flowchart showing operations when a UI operation is made to the mobile terminal 10;

FIG. 18 is a flowchart showing operations when a UI operation is made to the mobile terminal 10.

DETAILED DESCRIPTION OF THE PREFERRED EMBODIMENTS

Figure 4A:
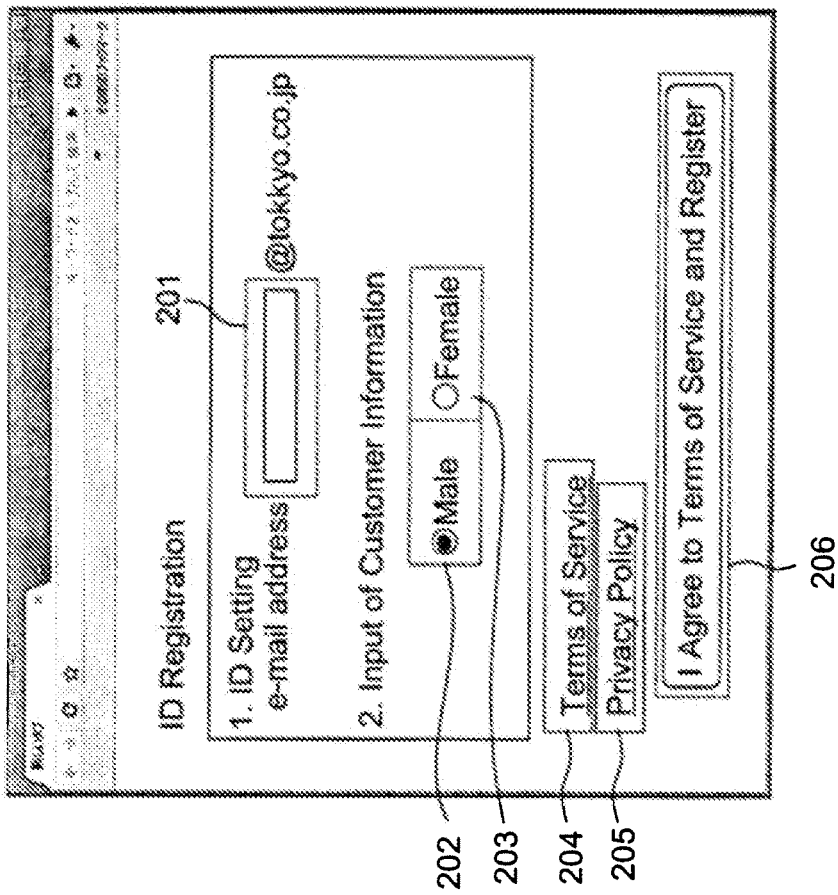

FIG. 1 is a conceptual diagram illustrating a case where a webpage for PCs (personal computers) is browsed using a display unit 14 of a mobile terminal 10 as with a case where the webpage is browsed using a display unit 2 of a PC 1. As shown in the diagram, the mobile phone according to the presently disclosed subject matter enables a user to browse the webpage for PCs in a page layout similar to that when the webpage is browsed using a PC.

Embodiments of the presently disclosed subject matter will hereinafter be described with reference to the accompanying drawings. In the description, a mobile phone is cited as an example of a client terminal; however, this is not intended to limit typed of the client terminal. Client terminals may include a so-called netbook and a network connectable PDA (personal digital assistance).

<First Embodiment>

FIG. 2 is a diagram showing an example of an overall configuration of a webpage browsing system 100 according to this embodiment. As shown in the figure, the webpage browsing system 100 includes a mobile terminal 10 used by a user, an external web server 30 and a relay server 20 relaying communications between the mobile terminal 10 and the external web server 30.

The mobile terminal 10 includes a communication unit 11, a processing unit 12, an input device 13 and a display unit 14.

The communication unit 11 controls communications with the relay server 20 using a prescribed protocol.

The mobile terminal 10 and the relay server 20 are connected via one or more wide-area network including the so-called Internet. The communication unit 11 and a communication unit 21, which will be described later, communicates with each other according to, for example, a standard Internet protocol such as the TCP/IP. Instead, connections may be made via a dedicated communication line or a VPN (Virtual Private Network).

The processing unit 12 causes the display unit 14 to display an image acquired from the relay server 20 via the communication unit 11, and perform processing on the basis of an input operation by a user to the input device 13.

The input device 13 includes a power button, number keys, a cross button and enter key, which are not shown. The user can operate the mobile terminal 10 by operating the input device 13. A touchscreen may be arranged on the display 14 and used as the input device 13.

The display unit 14, which is a liquid crystal display capable of color displaying, displays on the basis of an image signal inputted from the processing unit 12. Instead of the liquid crystal display, another type of display such as an organic EL may be used.

The relay server 20 includes a communication unit 21, an image converter 22, and a UI information analyzer 23.

The communication unit 21 controls communications with the mobile terminal 10, and controls communications with the external web server 30. The relay server 20 and the external web server 30 are connected to each other via one or more networks such as the Internet. The communication unit 21 and a communication unit 31, which will be described later, communicate with each other using, for example, a standard interne protocol.

The image converter 22 generates an image file similar to an appearance (page layout) shown by browsing page content (content file) acquired from the external web server 30 via the communication unit 21, on the basis of the content file. Here, the image file is generated in predetermined resolution. Instead, an image file may be generated according to details of the content or the resolution of the mobile terminal 10.

The UI information analyzer 23 extracts pieces of UI information from the acquired content file, analyzes the types and the positions thereof, and generates UI metadata.

The external web server includes a communication unit 31 and a storage unit 32.

The communication unit 31 controls communications with the relay server 20. The storage unit 32 stores content files of webpages established in the external web server 30. The communication unit 31 reads from the storage unit 32 a file corresponding to a URL request received from the relay server 20, and transmits the file to the relay server 20.

In FIG. 2, only one mobile terminal 10 is shown. However, a large number of mobile terminals 10 capable of communicating with the relay server 20 may exist, and separately communicate with the relay server 20. In addition, a large number of external web servers 30 may exist in a network such as the Internet; the relay server 20 may be configured to be capable of communicating with each of the external web servers 30. Thus, communications are performed via the relay server 20 in cases where any mobile terminal 10 accesses content in any external web server 30.

Next, operations of the webpage browsing system 100 thus configured will be described. First, operations until a desired webpage is displayed on the display unit 14 of the mobile terminal 10 will be described with reference to FIG. 3.

The user inputs a URL address of a webpage that he or she wants to browse, using the input device 13 of the mobile terminal 10. Instead of direct input of a character string, a barcode may be used to input a URL address. The barcode may be a linear barcode or a matrix barcode (2D barcode). Although many types of barcodes such as a QR code (trademark) created by Denso-Wave Incorporated, a Semacode (trademark) created by Semacode Corporation are known, any of them may be suitably used. In addition, the URL address may be selected using a bookmark or the like registered in a memory, which is not shown, in the mobile terminal 10. When transmission is designated through a transmitting button of the input device 13 after input of the URL address, the communication unit 11 transmits the inputted URL address to the relay server 20 (step S11).

A bookmark in a storage unit, which is not shown, of the relay server 20 may store titles and URL addresses of webpages, and a selection may be made from among the titles of the webpages. In this case, the relay server 20 transmits the titles of the webpages which are stored in the relay server 20, to the mobile terminal 10 via the communication unit 21; the mobile terminal 10 receives the titles via the communication unit 11. The processing unit 12 causes the display unit 14 to display the received titles of the webpages. The user selects a desired webpage from among the displayed titles of the webpages using the input device 13. The mobile terminal 10 may transmit the selected title of the webpage to the relay server 20 via the communication unit 11.

The relay server 20 receives, via the communication unit 21, the URL address transmitted from the mobile terminal 10 (step S21). The communication unit 21 transmits the received URL address to the external web server 30 to which the URL address corresponds (step S22). In a case where the title of the webpage is selected using the bookmark in the relay server 20, the corresponding URL address may be read from the storage unit, which is not shown, and transmitted to the corresponding external web server 30.

The corresponding external web server 30 receives this URL address via the communication unit 31 (step S31). The external web server 30 then reads, from the storage unit 32, content files, such as a HTML file, a CSS file and a Java (registered trademark) Script file, which correspond to the received URL address, and transmits the files to the relay server 20 via the communication unit 31 (step S32).

The relay server 20 receives the content files transmitted from the external web server 30 (step S23); the UI information analyzer 23 analyzes the received content files and extracts the UI information (step S24). The method of analyzing the content files here is not necessarily limited thereto. A well-known method for parsing the content files to extract tags may be used.

The UI information analyzer 23 generates the UI metadata on the basis of the analyzed result (step S25). FIGS. 4A to 4C are diagrams for illustrating generation of UI metadata. FIG. 4A shows a situation where a HTML file shown in FIG. 4B is browsed using a typical PC. Note that unnecessary parts of the HTML file shown in FIG. 4B are appropriately omitted.

The UI information analyzer 23 extracts UI information such as link tags and entry forms from the HTML file shown in FIG. 4B, and calculates position coordinates of each pieces of UI information in FIG. 4A.

For example, six tags, which are a text entry field tag 301, radio button tags 302 and 303, link tags 304 and 305, and a button tag 306, are described in the HTML file shown in FIG. 4B. The UI information analyzer 23 extracts the pieces of UI information 201 to 206 by extracting these tags from the HTML file.

The pieces of UI information 201 to 206 are arranged on the respective positions in a screen shown in FIG. 4A, in a situation where the HTML file is browsed. The UI information analyzer 23 acquires the XY coordinate values of the position of the starting point and the endpoint (coordinate values corresponding to top left and lower right) of each piece of the UI information. A method of acquiring the coordinate values is not necessarily limited; for example, a method of storing when image rendering and acquiring from a browser may be adopted.

Such extracted pieces of UI information and pieces of coordinate information thereof are associated with the corresponding UI information IDs (ID for identifying UI information), and stored as UI metadata in a storage unit, which is not shown, of the relay server 20. Here, the UI information IDs for identifying each piece of UI information are 201 to 206. FIG. 5 shows UI metadata stored as a CSV file. Attributes related to screen display (e.g., size attribute) such as layout is not required to be included in the UI metadata.

The image converter 22 renders the acquired content file and generates an image file in JPEG (Joint Photographic Experts Group) format, the bitmap format or the like displayable on the display unit 14 of the mobile terminal 10 (step S25). A method for generating the image file is not necessarily limited; a well-known method may be adopted.

FIG. 4C shows the image generated by rendering the HTML file shown in FIG. 4B. Here, the positions and the types of the pieces of UI information can be identified using the UI metadata shown in FIG. 5. For example, it can be seen that the pieces of UI information corresponding to the tags 301 to 306 are arranged on the positions 401 to 406 shown in FIG. 4C, respectively. The arrangement of these positions is similar to that of the pieces of UI information 201 to 206 in a browsing using a PC shown in FIG. 4A. The image files may be stored together with the UI metadata in the storage unit, which is not shown, of the relay server 20.

The relay server 20 transmits the UI metadata and the image file generated in step S25 to the mobile terminal 10 via the communication unit 21 (step S26). At this time, the content file used as a basis is associated with the mobile terminal 10, to which the file has been transferred, and the generated UI metadata, and stored in the storage unit, which is not shown. The mobile terminal 10 receives the UI metadata and the image file via the communication unit 11 (step S12).

Figure 6:
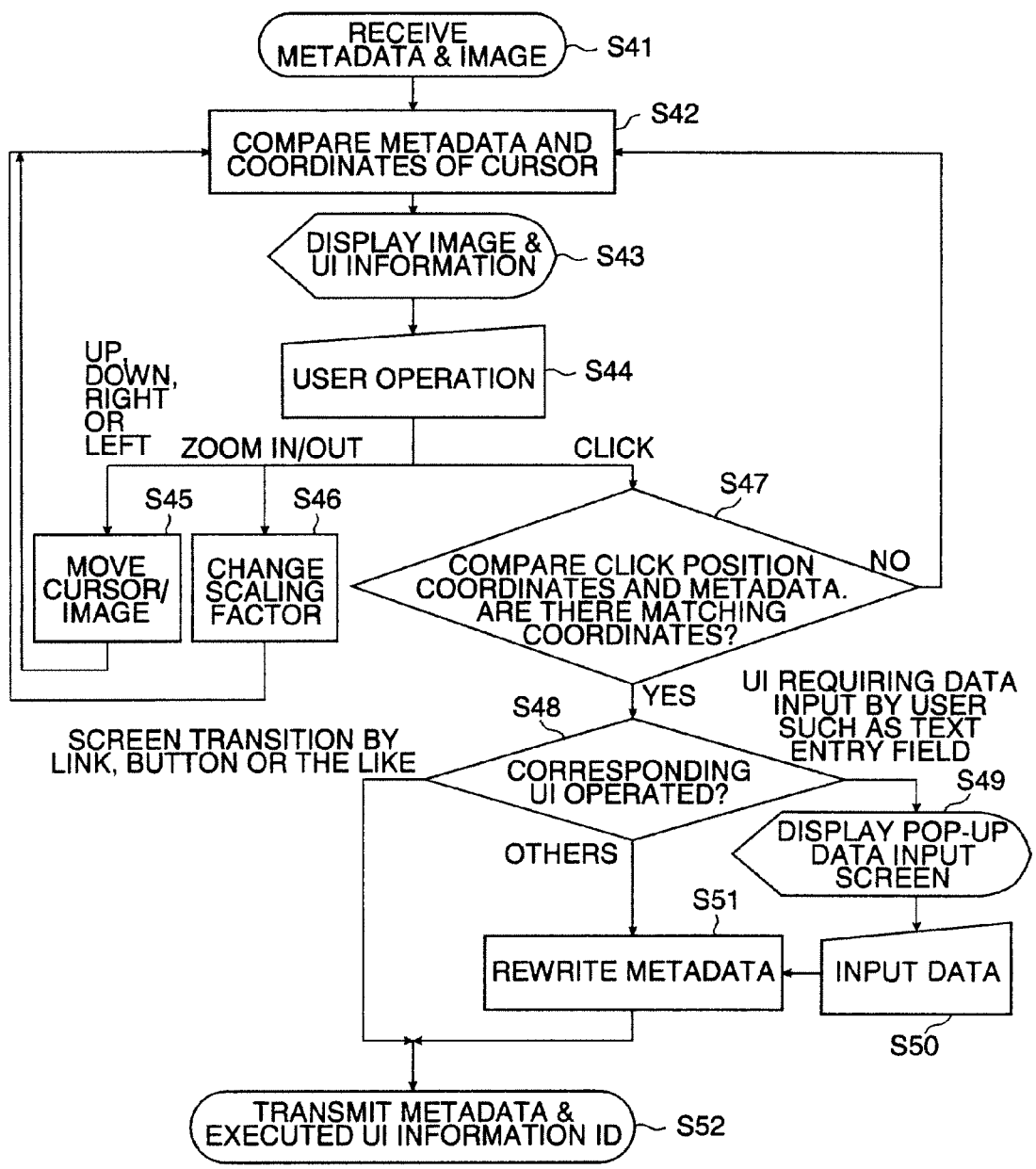
FIG. 6 is a flowchart showing internal processing of the mobile terminal 10.

Next, internal operations in the mobile terminal 10 having received the UI metadata and the image file will be described with reference to FIG. 6.

When mobile terminal 10 receives the UI metadata and the image file via the communication unit 11 (step S41), the processing unit 12 compares the position coordinates of the pieces of UI information included in the received UI metadata and the position coordinates of the cursor displayed on the display unit 14 with each other (step S42), and displays the image file and the UI information on the display unit 14 on the basis of the result of comparison (step S43).

For example, when the position coordinates of the cursor overlap the position coordinates of the piece of UI information, a mark is attached to a part at the position of the corresponding piece of UI information, in order to allow the user to recognize that the piece of UI information is selectable. Instead, underlining, drawing a box or the like may be adopted. Here, when the cursor is positioned in a rectangular area whose diagonal vertices are the XY coordinate values of each piece of the UI information recorded in the UI metadata, the position coordinates of the piece of UI information and the position coordinates of the cursor are regarded as being overlapped with each other. Instead of the case of the overlap, such display may always be made at the position on the displayed image of the piece of UI information. In a reversed manner, the color or shape of the cursor may be changed and displayed when the position coordinates of the cursor overlap the position coordinates of the piece of UI information.

Here, when the user operate the input device 13 (step S44), the display on the display unit 14 is changed according to the designation of the operation.

For example, an up, down, right or left operation is made using the cross button, the cursor or image is moved according to the operation (step S45).

Figure 7A:
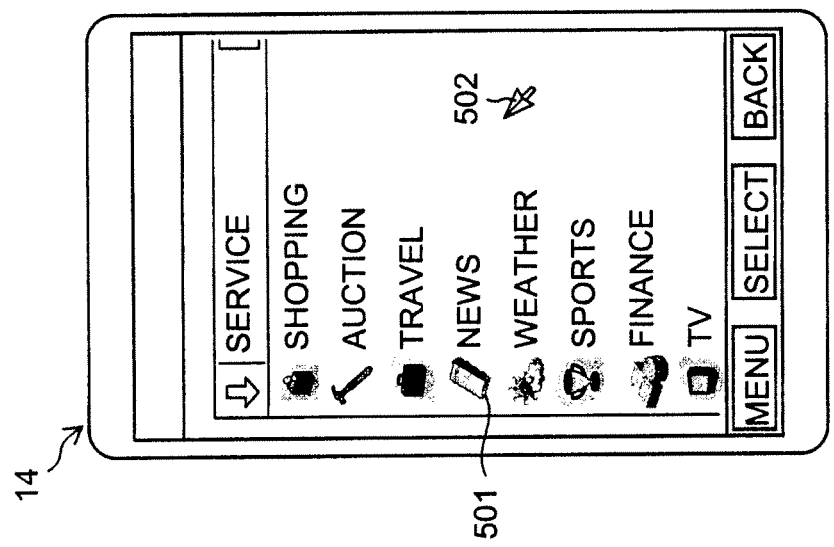
FIGS. 7A and 7B are diagrams showing a case where a cursor moves responsive to an operation.
Figure 7B:
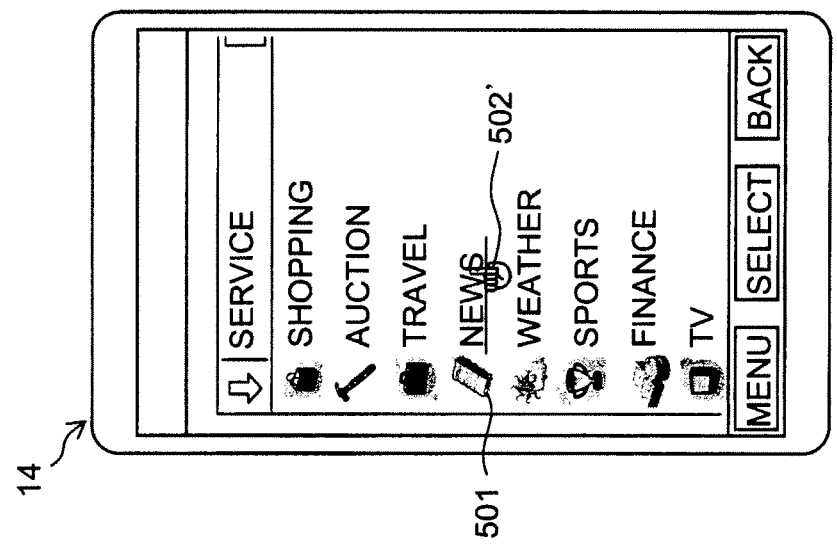

FIGS. 7A and 7B show a case where the cursor moves according to the operation. FIG. 7B shows a display when an operation of moving to upper left is made in a situation of FIG. 7A. The cursor 502 is moved to the position 501 (which is a link here) of the piece of UI information positioned at upper left on the screen in response to the user's operation, the position 501 of the piece of UI information is underlined and the shape of the cursor 502 is changed into that of a cursor 502' and displayed.

An operation using the enter button in this situation can display content to and with which the position 501 of the piece of UI information is linked and associated, as will be described later.

Figure 8B:
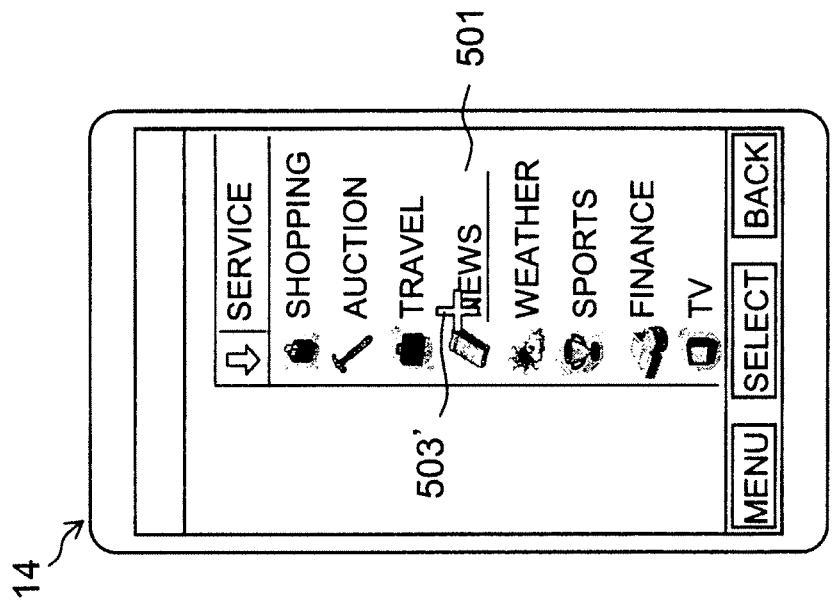

FIGS. 8A and 8B show a case where the image moves up, down, right or left according to moving operation when the input device 13 including a cross button is operated to move the image up, down, right or left. FIG. 8B shows a display when the input device 13 is operated to move the image rightward in a situation of FIG. 8A. The cursor 503 is fixed at the center of the screen of the display unit 14. The displayed image is moved according to a user operation. Here, when the position 501 of the piece of UI information is moved to overlap the cursor 503, the position 501 of the piece of UI information is underlined and the cursor 503 is changed into a cursor 503' with different color and displayed.

When an operation of zooming in or out is made in step S44, the scaling factor of the image is changed according to the operation and the changed image is displayed (step S46).

Figure 9A:
FIGS. 9A to 9C are diagrams showing a case where an image displayed on the display unit 14 is zoomed in and out.
Figure 9B:
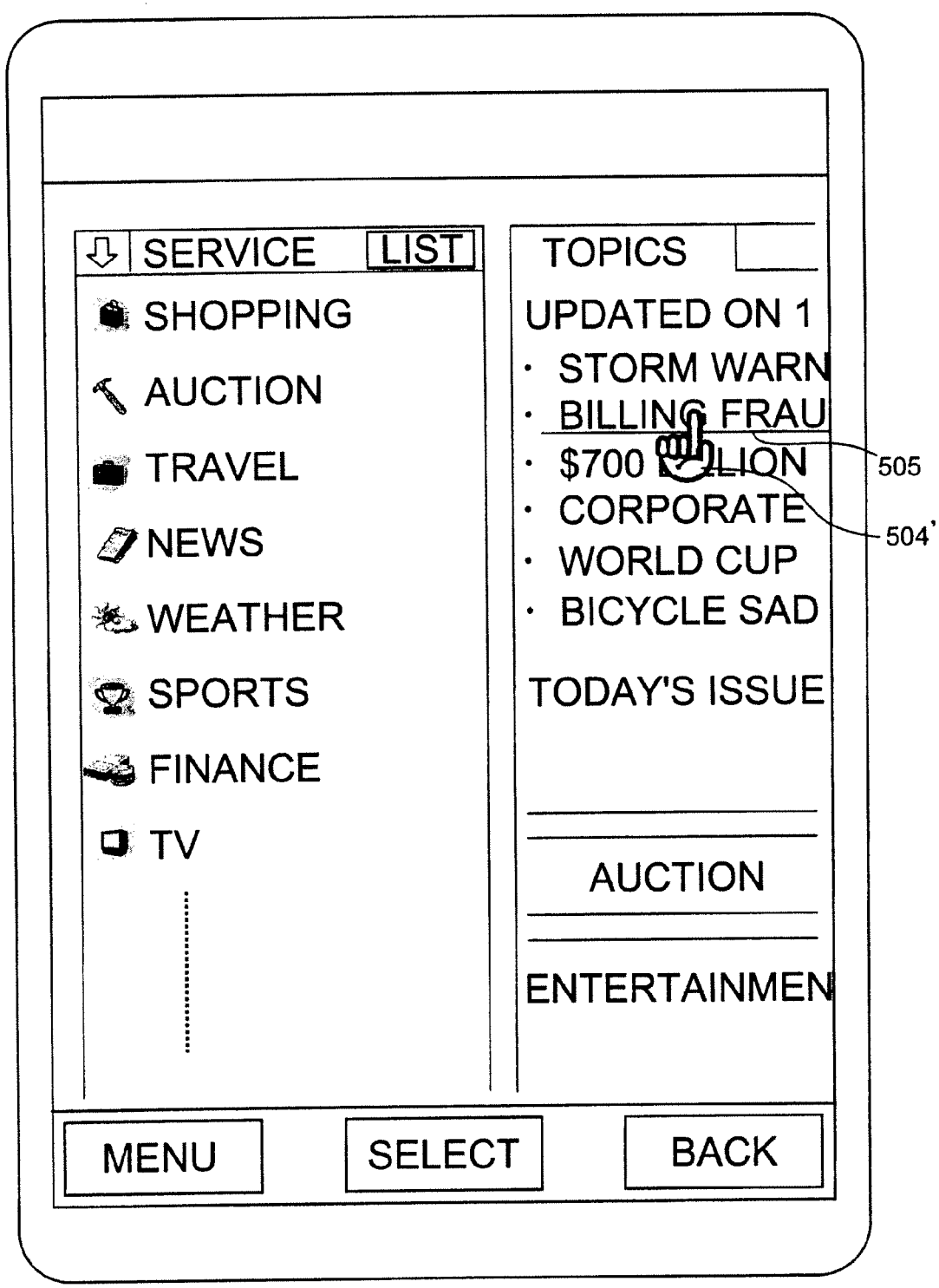
Figure 9C:
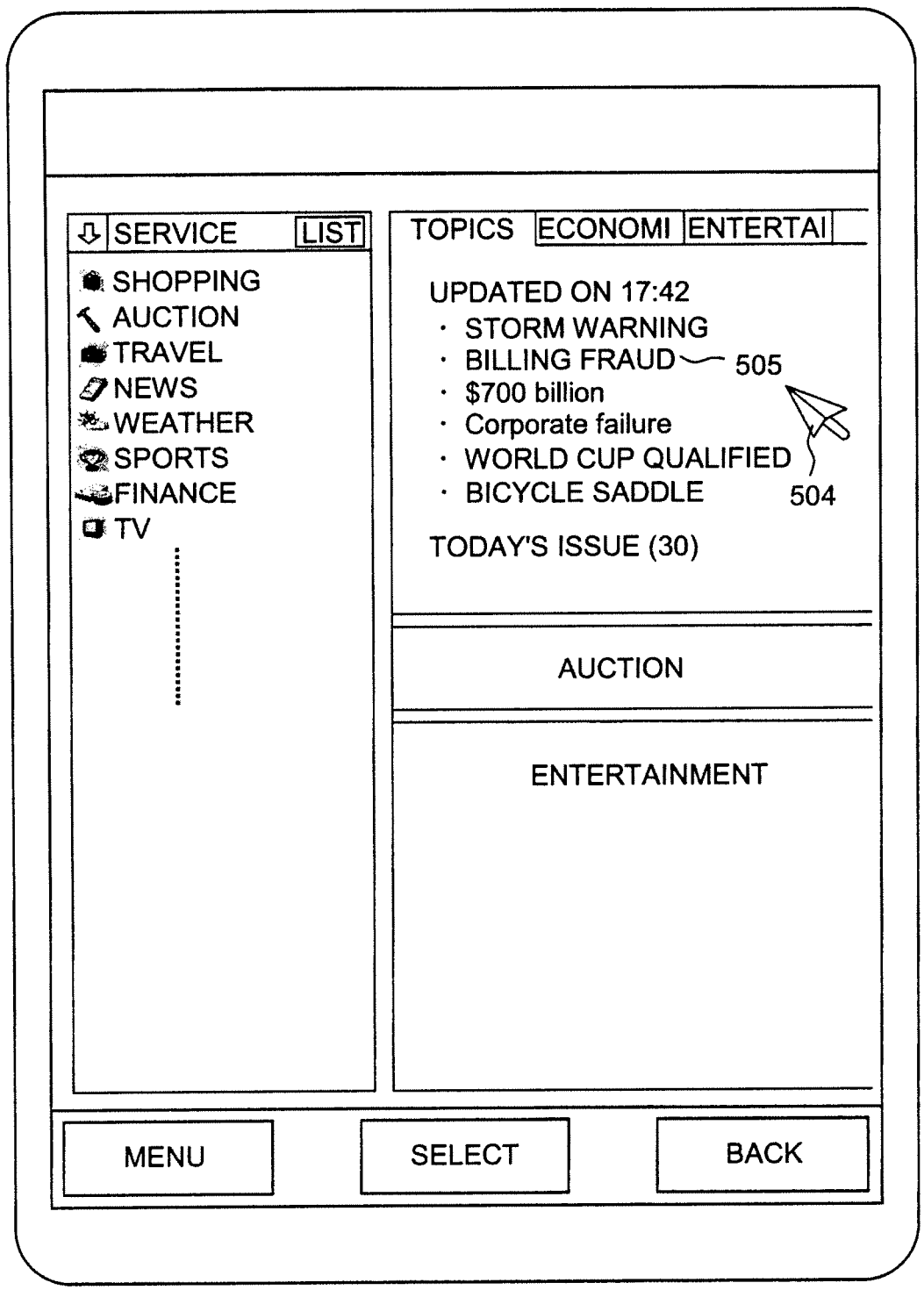

FIGS. 9A to 9C show a case where an image displayed on the display unit 14 is zoomed in and out. When a zoom-out operation is made in a situation of FIG. 9A, the image is reduced and displayed as shown in FIG. 9B. A further zoom-out operation can display the image is shown in FIG. 9C.

When a zoom-in operation is made in a situation of FIG. 9C, the image is enlarged and displayed as shown in FIG. 9B. A further zoom-in operation can display what is shown in FIG. 9A.

In FIGS. 9A to 9C, the position of the cursor 504 is not changed in the screen. However, the position of the cursor 504 is changed in the image, because the display scaling factor of the displayed image is changed centered at a position different from the position on which the cursor 504 is displayed.

As a result, although the position of the cursor 504 does not overlaps the position of the piece of UI information in the image in a situation shown in FIG. 9A, the position 505 of the piece of UI information (link) in the image and the position of the cursor 504 overlap each other in FIG. 9B. Accordingly, the position 505 of the piece of UI information in the image is underlined and the shape of the cursor 504 is changed into that of a cursor 504' and displayed.

When the enter button is operated (click operation) in step S44, it is determined whether the position of the cursor and the position of UI information in the image overlap each other or not on the basis of the result of comparison in step S42 (step S47).

When the position of the cursor does not overlap the position of the piece of UI information in the image, the processing unit 12 regards the click operation as void, returns to step S42 and perform analogous processing.

When the position of the cursor overlaps the position of piece of UI information in the image, the processing unit 12 determines the type of the piece of UI information existing at a position overlapping that of the cursor on the basis of the UI metadata (step S48).

Here, it is assumed that the types of pieces of UI information includes (1) a piece of UI information requiring a user input to a text entry field and the like, (2) a piece of UI information, such as a check box or a button, that is not accompanied by screen transition such as a link and does not require data input, and (3) a piece of UI information accompanied by screen transition such as a link or a button ("send" button and so on).

When the type of the piece of UI information existing at the position of the cursor is (1) a piece of UI information requiring a user input to a text entry field and the like, a data entry screen is displayed on the display unit 14 using a pop-up or the like and the user is requested for input (step S49). The user performs required data input on the input screen using the input device 13 (step S50). The processing unit 12 rewrites the UI metadata stored in the storage unit, which is not shown, according to the user input (step S51). The rewritten UI metadata is transmitted together with the rewritten UI information ID (that is, ID of the rewritten piece of UI information) to the relay server 20 via the communication unit 11 (step S52).

Here, the details of rewriting of the UI metadata will be described with reference to FIGS. 10A to 10D and 11A to 11C.

Figure 10A:
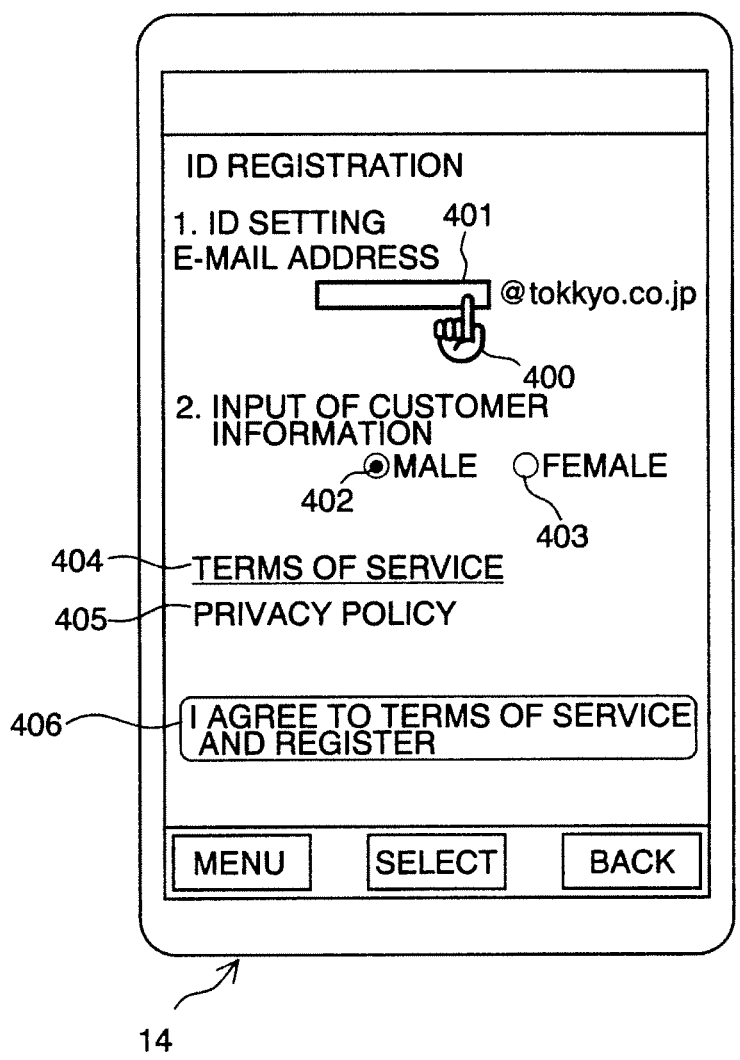

FIG. 10A shows an appearance where the image shown in FIG. 4C is displayed on the display unit 14. The pieces of UI information 201 to 206 are displayed on the positions 401 to 406 on the displayed images, respectively, as represented in the UI metadata shown in FIG. 11A. Here, when the user moves the cursor 400 to the position 401 corresponding to the piece of UI information 201 and performs a click operation, a text entry pop-up screen is displayed on the display unit 14 as shown in FIG. 10B.

The user inputs desired characters on the pop-up screen using the input device 13. A click operation is performed to the input device 13 after completion of the text input, the processing unit 12 rewrites the value attribute of the piece of UI information 201 corresponding to the position 401 on the basis of the inputted text. Here, the user inputs "shibukawa" on the text entry pop-up screen as shown in FIG. 10B. Accordingly, the value attribute of the piece of UI information 201 is rewritten to "shibukawa", as shown in FIG. 11B.

The rewritten UI metadata is transmitted together with the rewritten (executed) UI information ID (which is 201 here) of the rewritten UI information to the relay server 20 via the communication unit 11.

Next, a case (2) where the corresponding piece of UI information is not accompanied by screen transition and does not require data input will be described.

Figure 10C:
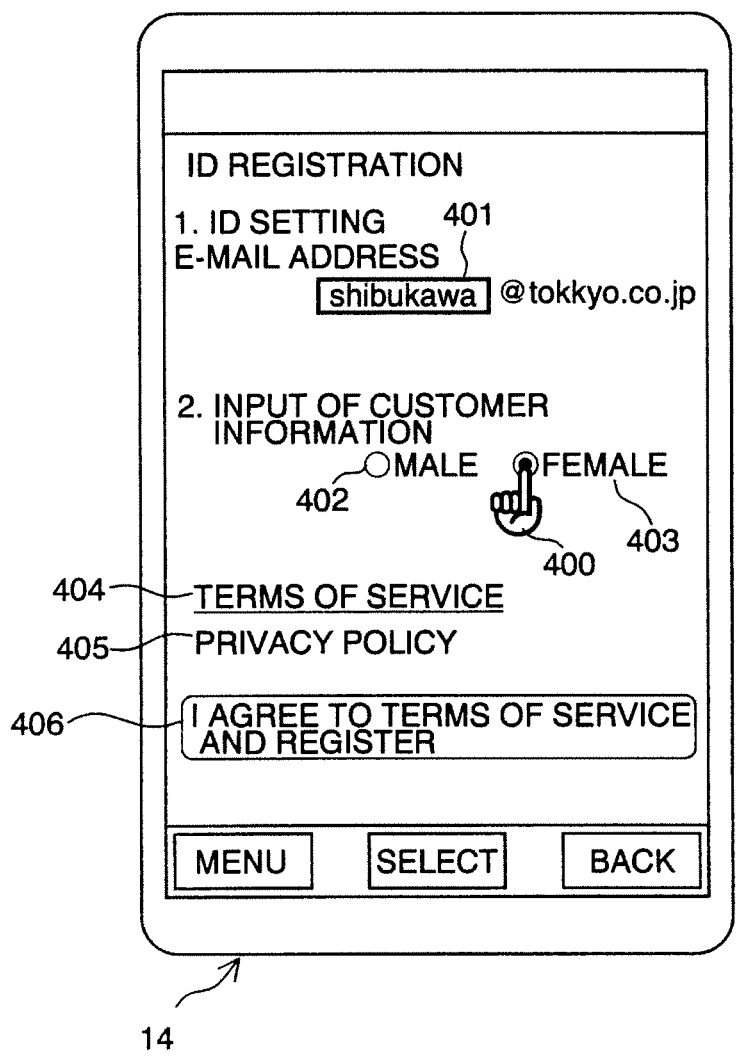

Radio buttons for designating sex are displayed on positions 402 and 403 shown in FIG. 10C corresponding to pieces of UI information 202 and 203, respectively. Tags 302 and 303, based on which the pieces of UI information 202 and 203 are displayed, respectively, have the same name attributes, as shown in FIGS. 4A to 4C. That is, any one of the pieces of UI information 202 and 203 can be selected. Here, according to a default setting, the checked attribute of the piece of UI information 202 is true, and the checked attribute of the piece of UI information 203 is false, as shown in FIG. 11A. Accordingly, a situation where the piece of UI information 202 is selected is represented as shown in FIG. 10A.

Here, when the cursor 400 is moved to the position 403 corresponding to the piece of UI information 203 and a click operation is performed, the processing unit 12 determines the type of the piece of UI information existing at the position overlapping the position of the cursor on the basis of the UI metadate.

In this case, the piece of UI information 203 is a radio button, which does not require data input by the user and is not accompanied by screen transition. Accordingly, the processing proceeds to step S51; the processing unit 12 rewrites the data related to the piece of UI information 203 in UI metadata stored in the storage unit, which is not shown.

FIG. 11C shows the rewritten UI metadata in this case. As shown in the figure, the checked attribute of the piece of UI information 203 is rewritten to true, and the checked attribute of a piece of UI information 202 having the same name attribute as the piece of UI information 203 is rewritten to false.

Finally, a case (3) where the corresponding piece of UI information is accompanied by screen transition will be described. The piece of UI information accompanied by screen transition means that another image different from that currently displayed is to be displayed as a result of execution of the piece of UI information.

Figure 10D:
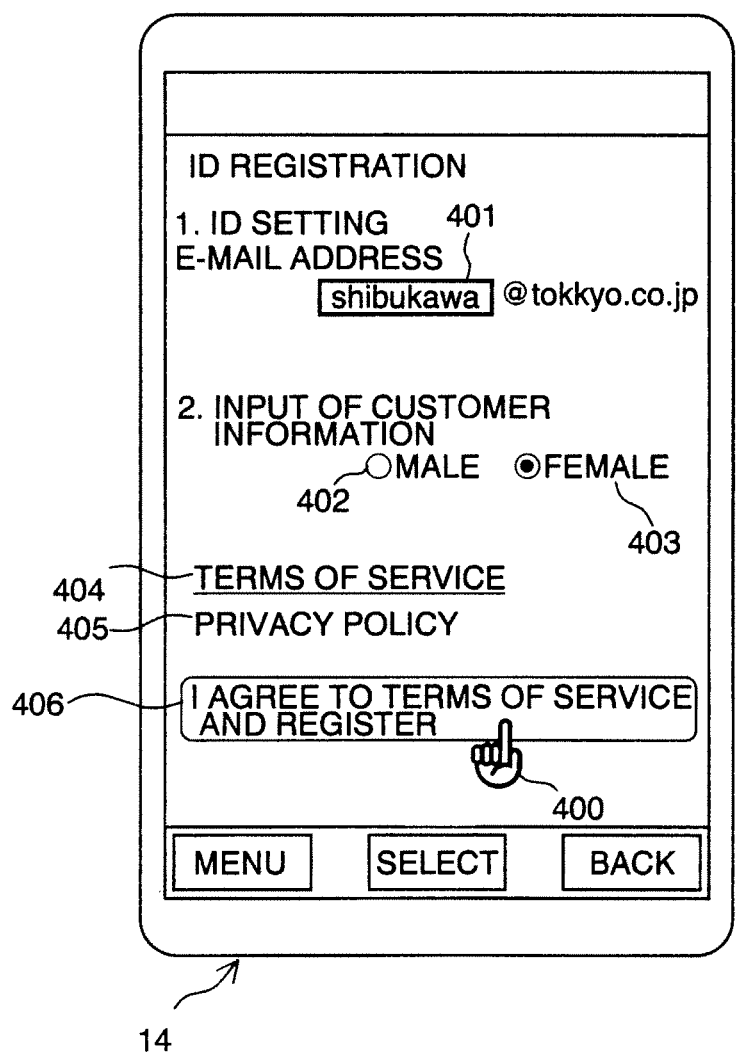

As shown in FIG. 10D, a transmitting button is displayed on the position 406 corresponding to the piece of UI information 206. A click operation on the position 406 makes transition to another screen according to the description of the tag 306. When the cursor 400 is moved to the position 406 and the click operation is made, the processing unit 12 determines the type of the piece of UI information existing on a position overlapping the position of the cursor on the basis of the UI metadata.

Here, since the piece of UI information 206 is a button and accompanied by screen transition, the processing proceeds to step S52. The executed UI information ID (that is, ID of the executed piece of UI information) (which is 206 here) is then transmitted together with the UI metadata to the relay server 20 via the communication unit 11 (step S52).

Thus, in any case where a click operation is performed to any type of piece of UI information, the UI metadata and the executed UI information ID are transmitted to the relay server.

Next, operations of the webpage browsing system 100 based on the executed UI metadata will be described with reference to FIG. 12.

When the UI metadata and the executed UI information ID are transmitted to the mobile terminal 10 (step S61), the relay server 20 receives the metadata and the ID via the communication unit 21 (step S71).

The UI information analyzer 23 analyzes the received UI metadata and the executed UI information ID, and analyzes which piece of UI information is executed among the UI metadata (step S72).

The UI information analyzer 23 determines whether communications with the external web server is required or not on the basis of the executed UI information (step S73). For example, when a link button is operated and where a displayed screen transits according to the operation, it is determined that the communications with the external web server is required.

When the executed piece of UI information requires communications with the external web server, the destination URL address (URL address of a destination webpage of the transition) is acquired from the content file stored in the storage unit, which is not shown, and transmitted to the external web server 30 concerned (step S74). The content file concerned is received from the external web server 30 (step S75), and the UI information analyzer 23 analyzes the destination content file (content file in the destination webpage of the transition) of to which the transition has been made (step S76).

The UI information analyzer 23 generates destination UI metadata on the basis of the result of the analysis, and the image converter 22 generates a destination image file on the basis of the destination content file (step S77). The destination image file and UI metadata are transmitted to the mobile terminal 10 via the communication unit 21 (step S78).

The mobile terminal 10 receives the image file and UI metadata via the communication unit 11, and the destination image file is displayed on the display unit 14 as the destination screen (step S62).

When it is determined that the executed piece of UI information does not require communications with the external web server in step S73, the processing proceeds to step S77, the content file associated with the rewritten UI metadata is read from the storage unit, which is not shown, and a new image is generated on the basis of the rewritten metadata. Instead of generation of the new image file, only a part of the image which the execution of the UI information needs alteration may be rewritten on the basis of an image of the original content file and the executed UI information ID.

The new image file and UI metadata are transmitted to the mobile terminal 10 via the communication unit 21 (step S78).

The mobile terminal 10 receives the image file and the UI metadata via the communication unit 11, and displays the image file on the display unit 14 (step S62).

For example, when the executed piece of UI information is the piece of UI information 201 (text entry field) shown in FIG. 10A, the rewritten UI metadata shown in FIG. 11B and the executed UI information ID 201 are transmitted from the mobile terminal 10 (step S61). The relay server 20 receives the metadata and the ID via the communication unit 21 (step S71).

The image converter 22 reads the content file associated with the rewritten UI metadata from the storage unit, which is not shown, and generates a new image file on the basis of the rewritten UI metadata. The new image file indicates an image where the characters "shibukawa" inputted in step S50 is displayed in the text entry field as shown in FIG. 10C.

When the executed piece of UI information is the piece of UI information 203 (radio button) shown in FIG. 10C, the rewritten UI metadata shown in FIG. 11C and the executed UI information ID 203 are transmitted from the mobile terminal 10 (step S61). The relay server 20 receives the metadata and ID via the communication unit 21 (step S71).

The image converter 22 reads the content file associated with the rewritten UI metadata from the storage unit, which is not shown, and generates a new image file on the basis of the rewritten metadata. The new image file indicates an image where the checked position of the radio buttons is changed from the position 402 to the position 403, as shown in FIG. 10D.

When the executed piece of UI information is the piece of UI information 206 (button) shown in FIG. 10D, the UI metadata (which is not rewritten in this case) and the executed UI information ID 206 are transmitted from the mobile terminal 10 (step S61). The relay server 20 receives the metadata and ID via the communication unit 21 (step S71).

The relay server 20 having received the metadata and ID acquires the destination URL address from the UI metadata, requests the content file concerned from the external web server 30 concerned (step S74), and receives the file (step S75). The UI information analyzer 23 generates UI metadata on the basis of this content file, and the image converter 22 generates an image file (step S77).

The destination image file and UI metadata are transmitted to the mobile terminal 10 (step S78), and the image file is displayed on the display unit 14 (step S62).

Thus, even when the UI operation accompanied by screen transition is made, the new destination webpage can be displayed and an operation on the UI information may be made as before.

As described above, the webpage browsing system 100 can realize rapid and highly operable webpage browsing.

<Second Embodiment>

Figure 13:
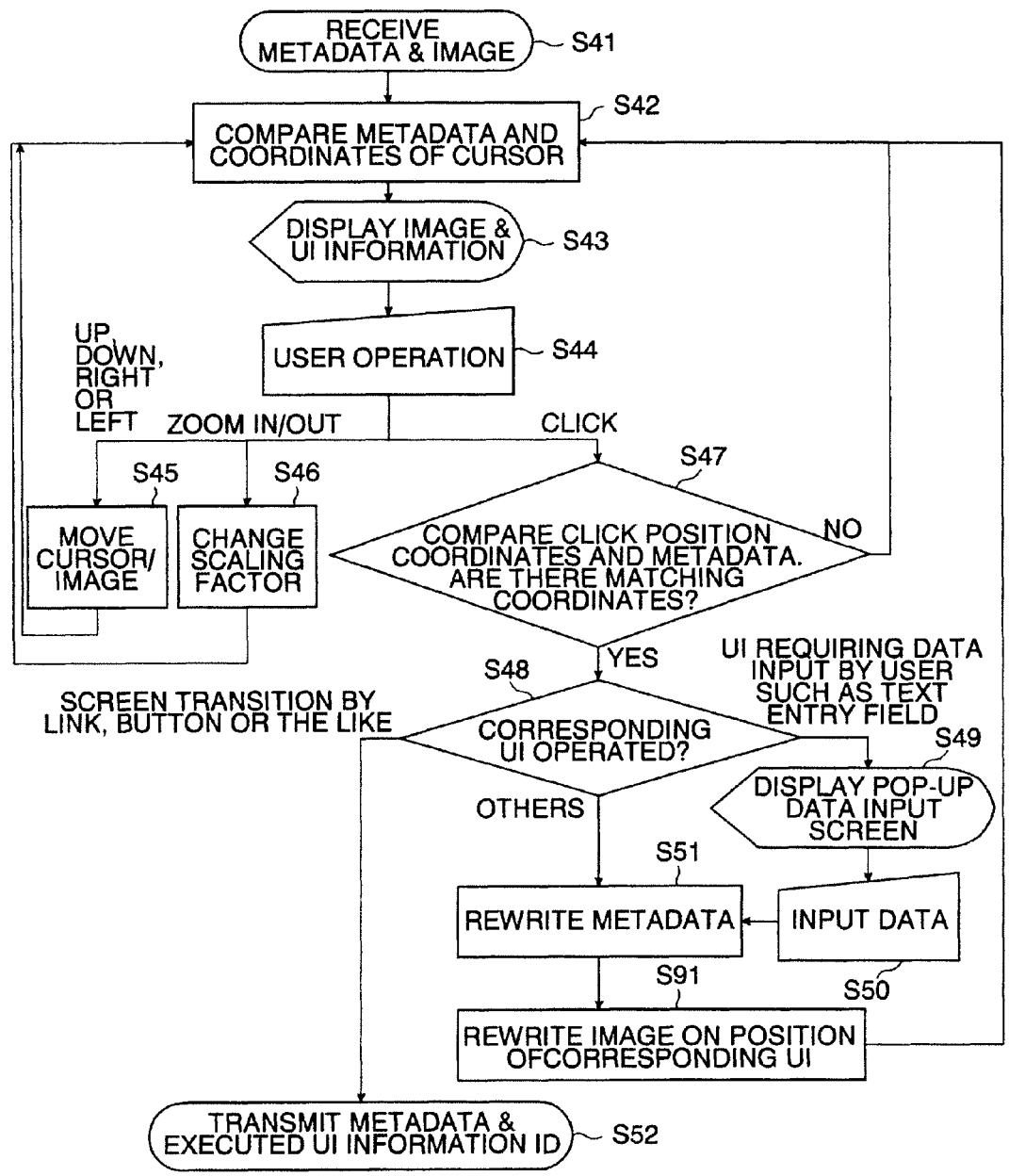
FIG. 13 is a flowchart showing internal processing of the mobile terminal 10.

FIG. 13 is a flowchart showing internal processing of the mobile terminal 10 of a second embodiment. Elements analogous to those in FIG. 6 will be assigned with the respective reference numerals identical thereto; the detailed description of the elements will be omitted.

When a text input is made on the position 401 corresponding to the piece of UI information 201 in a situation shown in FIG. 10A, the UI metadata is rewritten as shown in FIG. 11B. At this time, the mobile terminal 10 of the second embodiment does not communicate with the relay server 20. Instead, the processing unit 12 generates the image shown in FIG. 10C (step S91). Subsequently, the processing returns to step S42 and analogous processing is performed.

Likewise, when the position 403 corresponding to the piece of UI information 203 is clicked in a situation shown in FIG. 10C, communications with the relay server 20 are not performed. Instead, the processing unit 12 generates the image shown in FIG. 10D, where the checked position is moved. Subsequently, the processing returns to step S42 and analogous processing is performed.

Thus, when image rewriting occurs without screen transition, the mobile terminal 10 is configured to rewrite images. This enables to rewrite images in the mobile terminal 10 reduce the amount of communication between the mobile terminal 10 and the relay server 20 to eliminate the communication time. Accordingly, the operability of the mobile terminal 10 can be improved.

<Third Embodiment>

Figure 14:
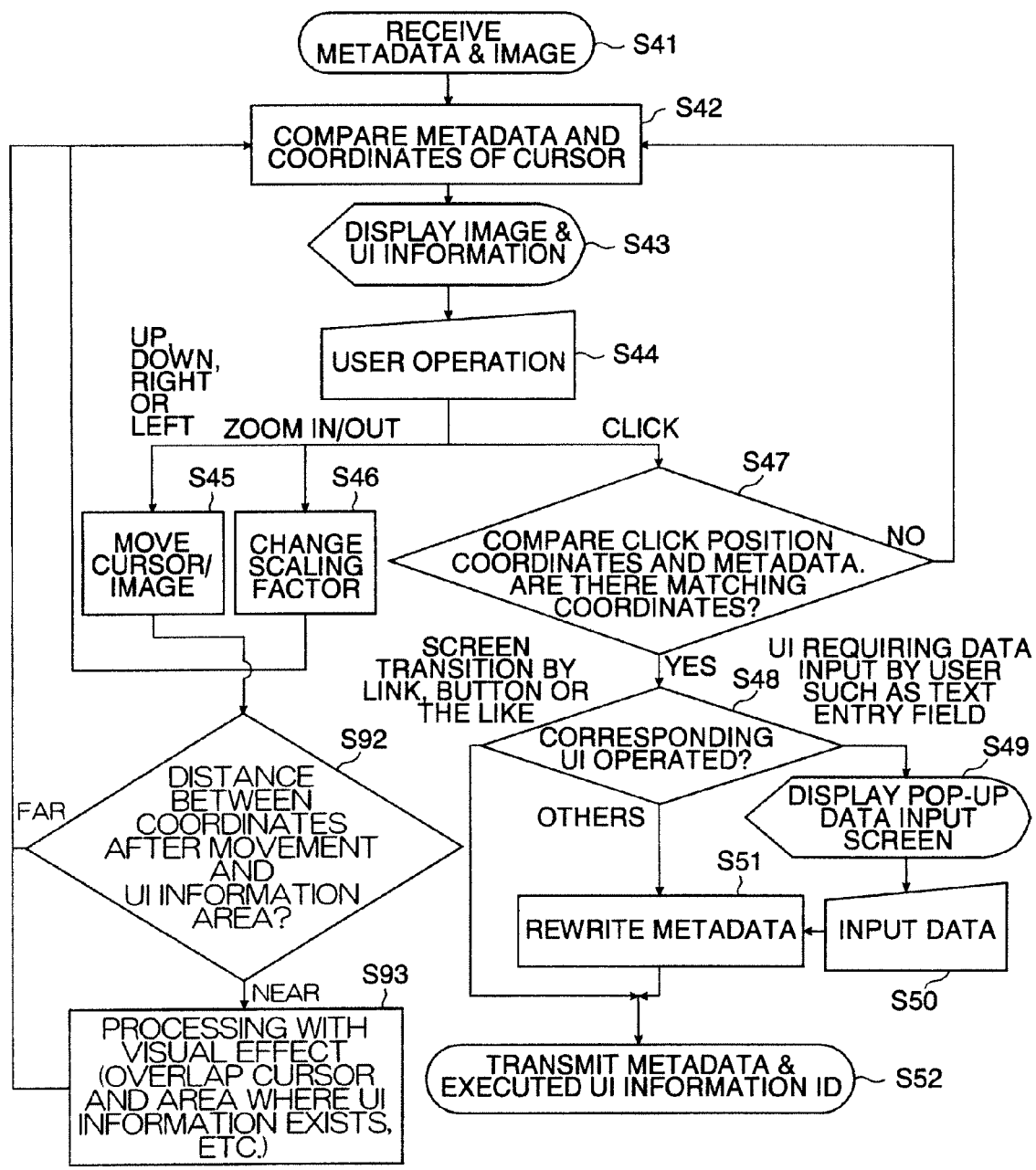
FIG. 14 is a flowchart showing internal processing of the mobile terminal 10.
Figure 15:
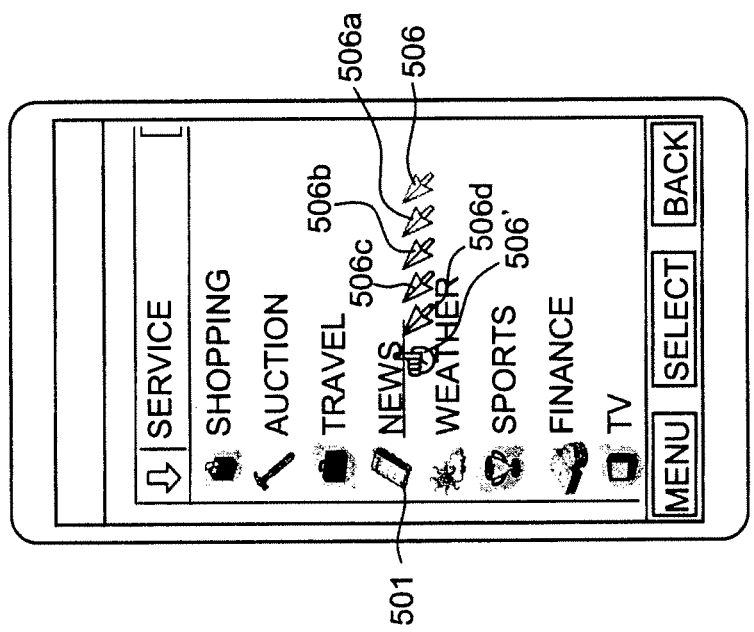
FIG. 15 is a diagram showing an appearance where the cursor is attracted to the UI information.

FIG. 14 is a flowchart showing internal processing of the mobile terminal 10 of a third embodiment. Elements analogous to those in FIG. 6 will be assigned with the respective reference numerals identical thereto; the detailed description of the elements will be omitted.

The mobile terminal 10 of the third embodiment is different from that of the first embodiment in that processing exerting a visual effect is performed according to the position of cursor and the position of the piece of UI information.

When the cross button and so on is operated to move up, down, right or left in step S45 in FIG. 14, an operation is made using the processing unit 12 moves the cursor or the image according to the operation.

On completion of the operation for movement, the position coordinates after the movement is calculated, it is determined whether or not the calculated position coordinates are in proximity to an area where the piece of UI information exists on the basis of the calculated position coordinates and the UI metadata (step S92). Here, it is determined whether the coordinates are in proximity or not using the prescribed number of pixels as a threshold. The threshold may appropriately be specified according to the scaling factor or the like of the image displayed on the display unit 14.

When it is determined that the coordinates are not in proximity, the processing returns to step S42, which is similar to the first embodiment. On the other hand, when it is determined that the coordinates are in proximity, the processing unit 12 performs the processing exerting a visual effect (step S93).

For example, the cursor is automatically moved to the position corresponding to the nearest piece of UI information. In an example shown in the figure, the cursor 506 is automatically moved to the position 501 of the piece of UI information, and changed into a cursor 506' on the position 501 of the piece of UI information and displayed. During movement of the cursor 506, cursor afterimages 506a, 506b, 506c and 506d are displayed on the path of the movement.

When the system is configured so that the image is moved with the cursor fixed according to the operation, the image may be moved so as to overlap the piece of UI information which is nearest to the cursor fixed at the center of the screen.

This configuration can improve the operability in browsing a website.

<Fourth Embodiment>

A forth embodiment is different from the first embodiment in that a server integrally including the relay server 20 and the web server 30 is used. Elements analogous to those in the first embodiment will be assigned with the respective reference numerals identical thereto; the detailed description of the elements will be omitted. With respect to the internal processing of the mobile terminal 10, any processing described in the first to third embodiments may be applied thereto; the detailed description of this processing will be omitted.

Figure 16:
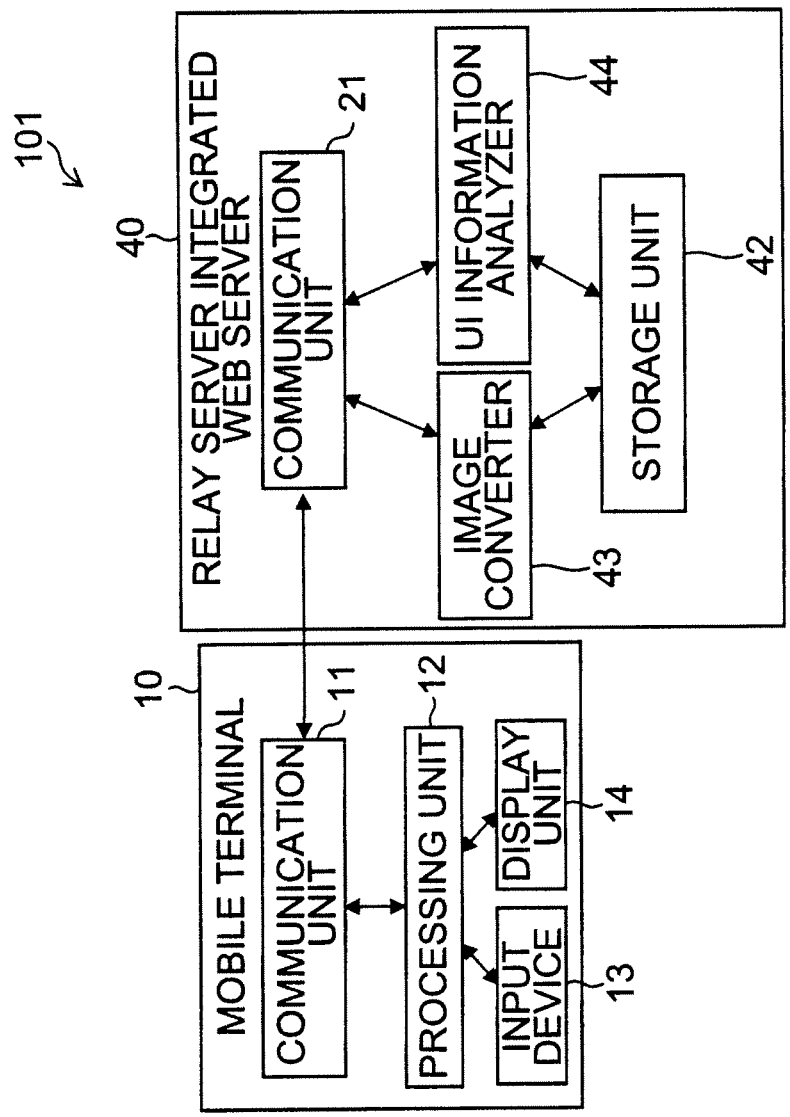
FIG. 16 is a diagram showing an example of an overall configuration of a webpage browsing system 101.

FIG. 16 shows an example of an overall configuration of a webpage browsing system 101 of this embodiment. As shown in this diagram, the webpage browsing system 101 includes: a mobile terminal 10 used by a user; and a relay server integrated web server (hereinafter referred to as an integrated server) 40 including functions of the relay server 20 for communicating with the mobile terminal 10 and functions of the external web server 30.

The integrated server 40 includes a communication unit 41, a storage unit 42, an image converter 43 and a UI information analyzer 44.

The communication unit 41 controls communications with the mobile terminal 10 and controls communications with the external web server 30.

The storage unit 42 stores content files of webpage established in the integrated server 40.

The image converter 43 reads, from the storage unit 42, a file according to the URL request received from the mobile terminal 10. The image converter 43 generates an image file having an appearance analogous to that where the content file is browsed using a PC, on the basis of the page content (content file) acquired from the storage unit 42. Here, the image file is generated in a predetermined resolution. Instead, an image file may be generated which has resolution determined according to details of the content or the resolution of the mobile terminal 10.

The UI information analyzer 44 extracts pieces of UI information from the acquired content file, analyzes the types and the positions thereof and generates UI metadata.

In FIG. 16, only one mobile terminal 10 is shown. However, a large number of mobile terminals 10 capable of communicating with the integrated server 40 may exist, and separately communicate with the integrated server 40.

Figure 17:
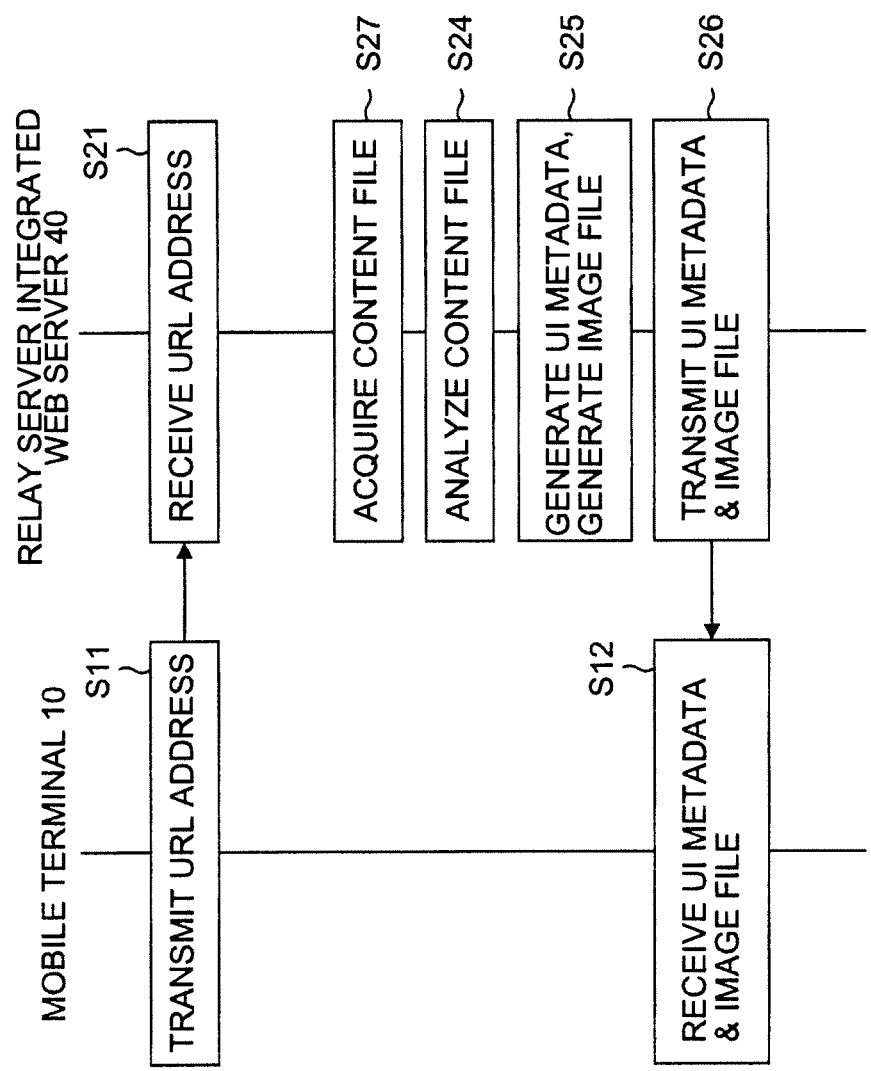
FIG. 17 is a flowchart showing operations until a desired webpage is displayed on the display unit 14 of the mobile terminal 10.

Next, operations of the webpage browsing system 101 having thus been configured will be described. First, operations until a desired webpage is displayed on the display unit 14 of the mobile terminal 10 will be described with reference to FIG. 17.

The user inputs a URL address of a webpage that he or she wants to browse using the input device 13 of the mobile terminal 10. Instead of direct input of a character string, for example, the URL address may be selected using a bookmark or the like registered in a memory, which is not shown, in the mobile terminal 10. When transmission is designated through a transmitting button of the input device 13 after input of the URL address, the communication unit 11 transmits the inputted URL address to the integrated server 40 (step S11).

A bookmark in a storage unit, which is not shown, of the integrated server 40 may store the titles and the URL addresses of webpage, and a selection may be made from among the titles of the webpage. In this case, the integrated server 40 transmits the stored titles of the webpage to the mobile terminal 10 via the communication unit 41; the mobile terminal 10 receives the titles via the communication unit 11. The processing unit 12 causes the display unit 14 to display the received titles of the webpage. The user selects a desired webpage from among the displayed titles of the webpage using the input device 13. The mobile terminal 10 may transmit the selected title of the webpage to the integrated server 40 via the communication unit 11.

The integrated server 40 receives, via the communication unit 41, the URL address transmitted from the mobile terminal 10 (step S21). The communication unit 41 outputs the received URL address to the image converter 43. The image converter 43 reads content files, such as a HTML file, a CSS file and a Java (registered trademark) Script file, which correspond to the received URL address (step S27). The read content files are outputted to the image converter 43 and the information analyzer 44.

The UI information analyzer 44 analyzes the content files read from the image converter 43 and extracts pieces of UI information (step S24).

The UI information analyzer 44 generates the UI metadata on the basis of the analyzed result (step S25). The image converter 43 renders the acquired content file and generates an image file, such as in the JPEG (Joint Photographic Experts Group) format or the bitmap format, displayable on the display unit 14 of the mobile terminal 10 (step S25).

The integrated server 40 transmits the UI metadata and the image file generated in step S25 to the mobile terminal 10 via the communication unit 41 (step S26). At this time, the content file used as a basis is associated with the mobile terminal 10, to which the file has been transferred, and the generated UI metadata, and stored in the storage unit, which is not shown, in the image converter 43. The mobile terminal 10 receives the UI metadata and the image file via the communication unit 11 (step S12).

Next, operations of the webpage browsing system 101 based on the executed UI metadata will be described with reference to FIG. 18.

When the UI metadata and the executed UI information ID are transmitted from the mobile terminal 10 (step S61), the integrated server 40 receives the UI metadata and ID via the communication unit 41 (step S71).

The UI information analyzer 44 analyzes the received UI metadata and the executed UI information ID, and analyzes which piece of UI information is executed among the UI metadata (step S72).

The UI information analyzer 44 determines whether acquisition of data from the storage unit 42 is required or not on the basis of the executed UI information (step S79). For example, when a link button is operated and a screen transits according to the operation, it is determined that data acquisition is required.

When the executed piece of UI information is determined to require acquisition of data from the storage unit 42 (YES in step S79), the content file concerned is acquired from the storage unit 42 (step S80). The UI information analyzer 44 analyzes the destination content file (step S76).

The UI information analyzer 44 generates destination UI metadata on the basis of the result of the analysis, and the image converter 43 generates a destination image file on the basis of the destination content file (step S77). The destination image file and UI metadata are transmitted to the mobile terminal 10 via the communication unit 41 (step S78).

The mobile terminal 10 receives the destination image file and UI metadata via the communication unit 11, and the destination image file is displayed on the display unit 14 as the destination image (step S62).

When the executed piece of UI information is determined not to require acquisition of data from the storage unit 42 (NO in step S79), the processing proceeds to step S77, the image converter 43 reads the content file associated with the rewritten UI metadata from the storage unit, which is not shown, in the image converter 43, and generates a new image file on the basis of the rewritten metadata. Instead of generation of the new image file, only a part of the image which the execution of the UI information needs alteration may be rewritten on the basis of an image of the original content file and the executed UI information ID.

The new image file and UI metadata are transmitted to the mobile terminal 10 via the communication unit 41 (step S78).

The mobile terminal 10 receives the image file and the UI metadata, and displays the image file on the display unit 14 (step S62).

As described above, the webpage browsing system 101 can realizes rapid and highly operable webpage browsing. In particular, the content file is thus stored in the integrated server 40, thereby realizing further rapid processing in comparison with a case of acquiring the content file from the external web server.

The mobile webpage browsing system 101 of this embodiment thus includes the mobile terminal 10 and the integrated server 40; the integrated server 40 may be configured to be connectable to a large number of external web servers 30 existing in the Internet. The integrated server 40 and the external web servers 30 are connected to each other via, for example, the Internet; the communication units 41 and 31 communicate with each other according to the standard internet protocol. This configuration enables content files which are not stored in the integrated server 40 to be browsed. A method identical to that acquiring the content files by the relay server 20 from the external web server 30 in the first embodiment may be applied to a method of acquiring the content file by the integrated server 40 from the external web server 30.

What is claimed is:

1. A website browsing system connecting a client terminal to a server,
   wherein the server comprises:
   a page content acquisition device which acquires page content requested by the client terminal;
   an image convertor which converts the acquired page content into an image;
   a user interface (UI) information analyzer which extracts UI information from the acquired page content and generates UI information metadata on a basis of the extracted UI information;
   a device which transmits the converted image and the generated UI information metadata to the client terminal; and
   a screen transition determination device which determines whether an execution of the UI information at the client terminal accompanies a transition of a screen displayed at a display device of the client terminal or not,
   wherein the client terminal comprises:
   a device which requests desired page content from the server;
   a device which receives the image of the requested page content and the UI information metadata transmitted from the server;
   a display control device which controls to make the image displayed on the display device;
   a UI information control device which controls the UI information on the image displayed on the display device based on the UI information metadata; and
   an execution device which executes the UI information on the image displayed on the display device, wherein the client terminal transmits the UI information metadata rewritten in accordance with an operation by the user and information for specifying the executed UI information, wherein the server determines whether the execution of the UI information at the client terminal accompanies transition of the screen displayed at the display device of the client terminal or not by the screen transition determination device, based on the rewritten UI information metadata and the information for specifying the executed UI information which are received from the client terminal, and wherein, when it is determined that the execution of the UI information accompanies transition of the screen displayed at the display device, the server transmits an image of page content to be displayed next and UI information metadata, which are prepared based on the received pieces of information, to the page content to the client terminal.

2. The website browsing system according to claim 1, wherein the client terminal further comprises:
a device which rewrites the image based on the rewritten UI information metadata.

3. The website browsing system according to claim 1, wherein the client terminal further comprises:
a device which transmits the rewritten UI information data to the server, and
wherein the server further comprises:
a device which receives the rewritten UI information metadata transmitted from the client terminal;
a device which rewrites the image based on the received UI information metadata; and
a device which transmits the rewritten image to the client terminal.

4. The website browsing system according to claim 2, wherein the client terminal further comprises:
a device which transmits to the server information identifying the UI information executed by the execution device when the executed UI information accompanied by screen transition,
wherein the server receives the information identifying the executed UI information, and transmits to the client terminal the image of the page content to be subsequently displayed and the UI metadata of the page content based on the received information.

5. The website browsing system according to claim 2, wherein the execution device comprises:
a movement device which relatively moves a cursor and the image displayed on the display device; and
a determination device which determines the UI information existing on a position overlapping a position of the cursor as the UT information to be executed.

6. The website browsing system according to claim 5, wherein the movement device moves the cursor with reference to the image displayed on the display device.

7. The website browsing system according to claim 5, wherein the movement device moves the image with reference to the cursor with the cursor displayed at a substantial center of the display device.

8. The website browsing system according to claim 5, wherein the movement device displays a visual effect based on the UI information metadata.

9. The website browsing system according to claim 1, wherein the server further comprises a storage device in which the page content is stored, and
wherein the page content acquisition device acquires the page content from the storage device.

10. The website browsing system according to claim 1, wherein the server comprises a device which connects to a web server, and
wherein the page content acquisition device acquires the page content from the web server via the device which connects to the web server.

11. The website browsing system according to claim 3, wherein the execution device comprises:
a movement device which relatively moves a cursor and the image displayed on the display device; and
a determination device which determines the UI information existing on a position overlapping a position of the cursor as the UI information to be executed.

12. The website browsing system according to claim 11, wherein the movement device displays a visual effect based on the UI information metadata.

13. The website browsing system according to claim 1, wherein the screen transition determination device comprises a UI information analyzer that causes the transition of the screen by an operation to a link button.

* * * * *